US007747621B2

(12) United States Patent
Sato et al.

(10) Patent No.: US 7,747,621 B2
(45) Date of Patent: Jun. 29, 2010

(54) GENERATING A RELATION DIAGRAM OF DATA FILES

(75) Inventors: Hisashi Sato, Iruma (JP); Yoshitaka Masuzawa, Kyoto-fu (JP); Mitsuhiro Yamamoto, Ootsu (JP); Katsuya Yamashita, Tokyo (JP); Hideyuki Fujiwara, Yokohama (JP); Shigeto Nakayama, Takatsuki (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 11/012,100

(22) Filed: Dec. 16, 2004

(65) Prior Publication Data

US 2005/0160109 A1     Jul. 21, 2005

(30) Foreign Application Priority Data

Dec. 19, 2003  (JP) ............................. 2003-423837
Dec. 9, 2004   (JP) ............................. 2004-357321
Dec. 9, 2004   (JP) ............................. 2004-357322

(51) Int. Cl.
  *G06F 7/00*   (2006.01)
  *G06F 17/30*  (2006.01)
  *G06F 3/048*  (2006.01)
(52) U.S. Cl. ..................... 707/736; 707/758; 715/515; 715/526; 715/838
(58) Field of Classification Search ........................ None
    See application file for complete search history.

(56) References Cited

U.S. PATENT DOCUMENTS 5,561,613 A    10/1996  Kobayashi et al. .......... 364/561

5,926,633 A   7/1999   Takagi et al. ................. 395/566
5,930,014 A   7/1999   Yamamoto ................... 359/118
5,963,952 A * 10/1999  Smith ........................... 707/102
5,983,241 A   11/1999  Hoshino ....................... 707/203

(Continued)

FOREIGN PATENT DOCUMENTS

EP         1045314 A2 * 10/2000

(Continued)

OTHER PUBLICATIONS

Netflix web page archived on Feb. 10, 2003 at: http://web.archive.org/web/20030210123708/www.netflix.com/Recs?community=y.*

(Continued)

*Primary Examiner*—Charles Rones
*Assistant Examiner*—Harold A Hotelling
(74) *Attorney, Agent, or Firm*—Fitzpatrick, Cella, Harper & Scinto

(57) ABSTRACT

The invention provides a system that associates data files with one another effectively to visually represent a relation among the data files and allows a user to easily understand relationship of contents of the data files. The system determines whether there is a parent data file for a selected retrieval object data file with reference to a contract association table and, if the parent data file is present, changes the retrieval object to the parent data file and repeats the processing. If the parent data file is not present, the system stores a present retrieval object data file as display data, that is, store a top data file as display data. Then, the system retrieves all data files associated with the top data file, stores the data files as display data, generates a relation diagram of the data files, and transmits the relation diagram to a user terminal.

29 Claims, 36 Drawing Sheets

U.S. PATENT DOCUMENTS

| | | | |
|---|---|---|---|
| 6,005,862 A | 12/1999 | Yamamoto | 370/392 |
| 6,314,426 B1 * | 11/2001 | Martin et al. | 707/100 |
| 6,477,528 B1 | 11/2002 | Takayama | 707/5 |
| 6,493,350 B2 | 12/2002 | Hojo et al. | 370/420 |
| 6,546,393 B1 * | 4/2003 | Khan | 707/10 |
| 6,564,206 B1 | 5/2003 | Ikeda | 707/3 |
| 7,028,050 B1 * | 4/2006 | Rose | 707/104.1 |
| 7,035,853 B2 | 4/2006 | Umeki et al. | 707/8 |
| 7,085,766 B2 * | 8/2006 | Keith, Jr. | 707/101 |
| 2002/0135621 A1 * | 9/2002 | Angiulo et al. | 345/838 |
| 2002/0156808 A1 * | 10/2002 | Duffy et al. | 707/505 |

FOREIGN PATENT DOCUMENTS

| | | |
|---|---|---|
| JP | 04-195556 | 7/1992 |
| JP | 5307613 | 11/1993 |
| JP | 09-034763 | 2/1997 |
| JP | 09-185660 | 7/1997 |
| JP | 9-185660 | 7/1997 |
| JP | 9223055 | 8/1997 |
| JP | 11-045197 | 2/1999 |
| JP | 11-102303 | 4/1999 |
| JP | 11-102313 | 4/1999 |
| JP | 2000-132440 | 5/2000 |
| JP | 2000-163306 | 6/2000 |
| JP | 2001-43231 | 2/2001 |
| JP | 2001-056727 | 2/2001 |
| JP | 2001-216330 | 8/2001 |
| JP | 2001-306617 | 11/2001 |
| JP | 2002-140344 | 5/2002 |
| JP | 2002-140716 | 5/2002 |
| JP | 2002-149703 | 5/2002 |
| JP | 2002-297436 A | 10/2002 |
| JP | 2004-013414 | 1/2004 |

OTHER PUBLICATIONS

Japanese Office Action dated Jan. 11, 2008 in corresponding Japanese Application No. 2004-357321 (English translation included).

Japanese Office Action dated Dec. 21, 2007 in corresponding Japanese Application No. 2004-357322 (English translation included).

Japanese Office Action dated Mar. 11, 2008 in corresponding Japanese application No. 2004-357322.

English Translation of Japanese Office Action dated Mar. 11, 2008 in corresponding Japanese application No. 2004-357322.

* cited by examiner

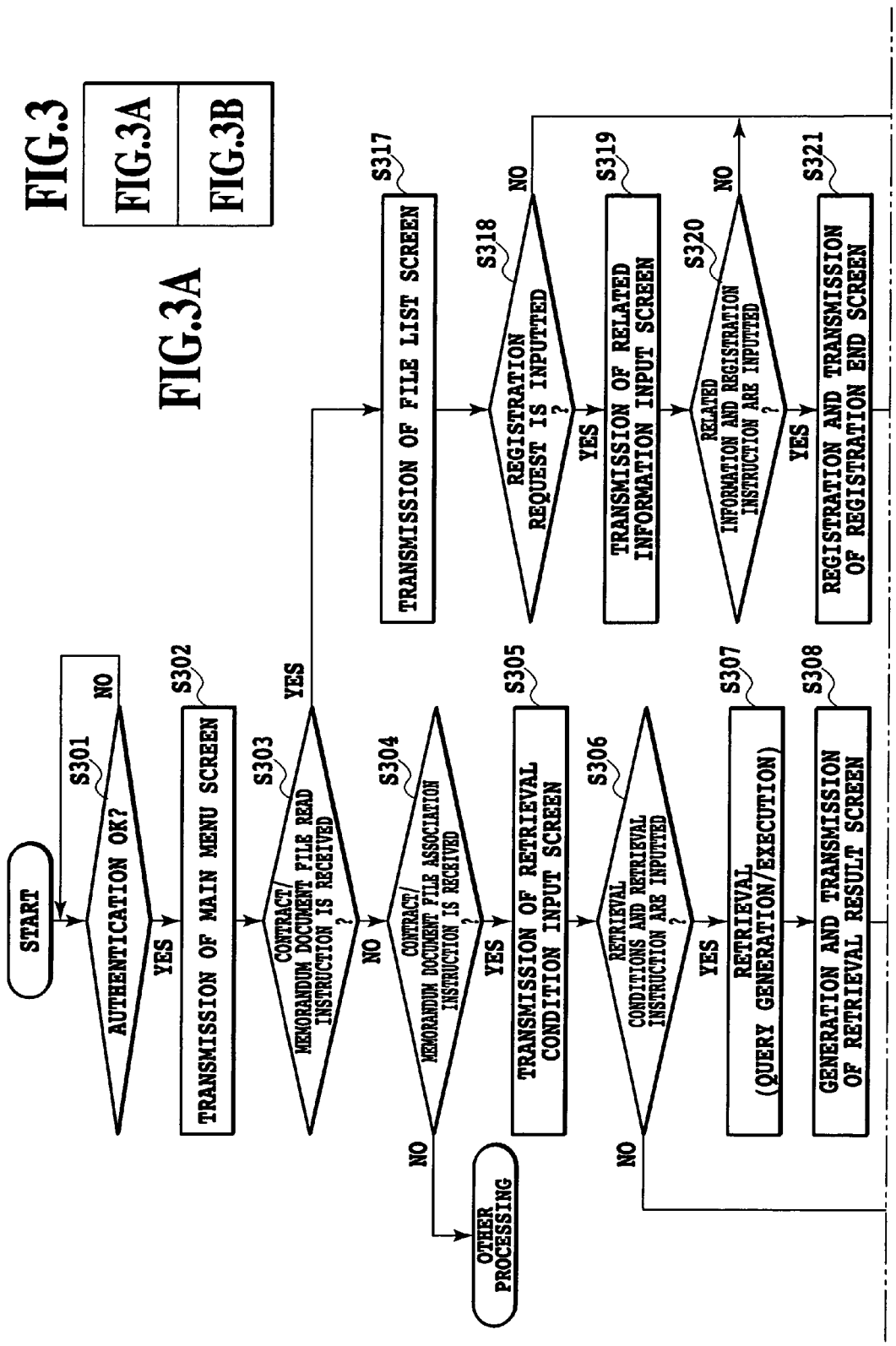

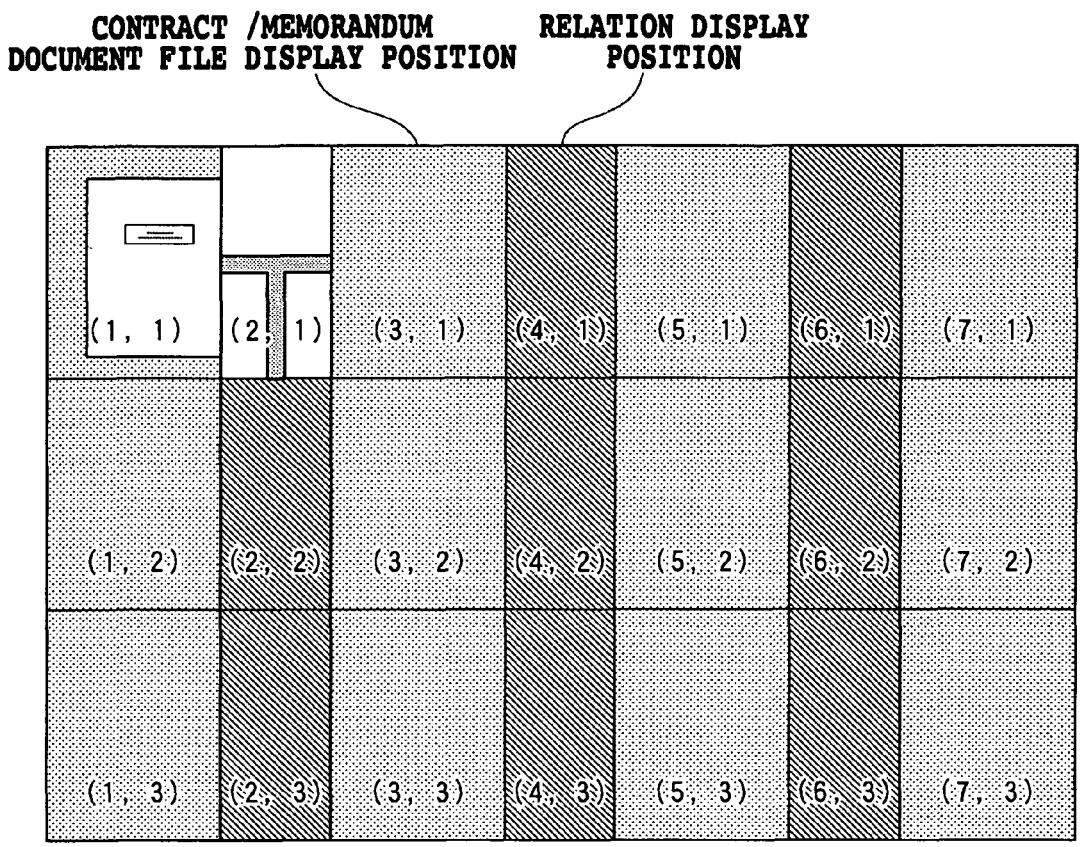
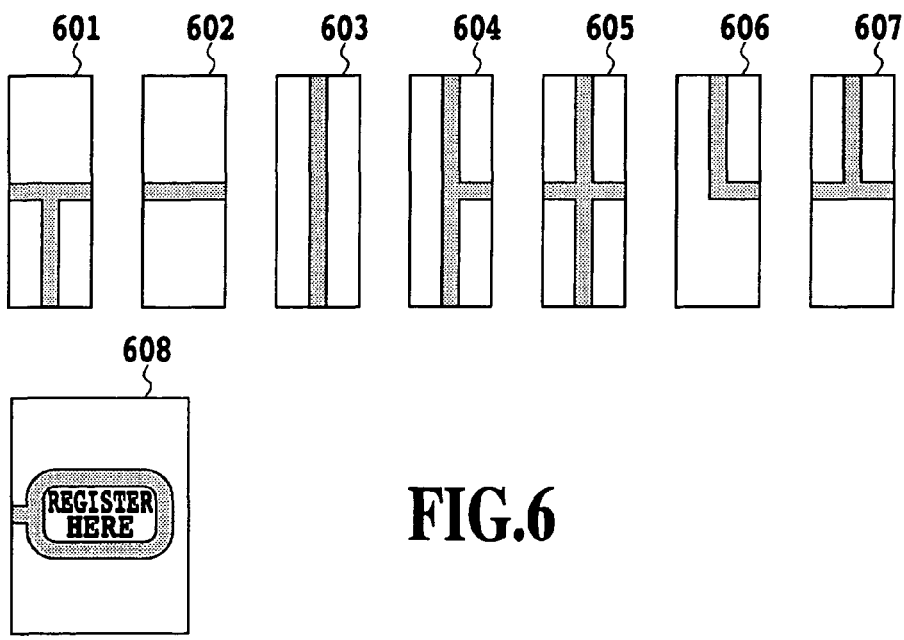
FIG.6

FIG.9

INPUT OF CONTRACT/MEMORANDUM RELATED INFORMATION

| INFORMATION READ | -PLEASE SELECT- ▽ |
|---|---|
| CLASSIFICATION | ○ MASTER CONTRACT<br>○ MEMORANDUM<br>○ SPECIFICATIONS |
| NAME OF CONTRACT | |
| PLACE OF CONTRACT | |
| CONTRACTOR | |
| DATE OF CONTRACT | |
| CONTENTS OF CONTRACT | ◁ ▷ |
| AMOUNT OF CONTRACT | |
| TERM OF CONTRACT | Y [ ] M [ ] D [ ] ~ Y [ ] M [ ] D [ ] |

<< RETURN

PAGE / LAYER / SIGNATURE / BOOKMARK

ASSOCIATION DESTINATION DATA RETRIEVAL LIST

| NAME OF CONTRACT |
| CONTRACTOR |
| PERSON IN CHARGE OF CONTRACT |
| DATE OF CONTRACT |

RETRIEVE

CLOSE

CLOSE

ASSOCIATION DATA RETRIEVAL LIST

◁ TO PREVIOUS PAGE                                                    CLOSE

No.1
                                                          TO NEXT PAGE ▷
| | |
|---|---|
| | SELECT   PDF FILE DOWNLOAD |
| CLASSIFICATION | MASTER CONTRACT |
| NAME OF CONTRACT | NAME OF CONTRACT0001 |
| CONTRACTOR | CONTRACTOR0001 |
| PERSON IN CHARGE OF CONTRACT | PERSON IN CHARGE OF CONTRACT0001 |
| DATE OF CONTRACT | 2003/01/01 |

1204

No.2
| | |
|---|---|
| | SELECT   PDF FILE DOWNLOAD |
| CLASSIFICATION | MASTER CONTRACT |
| NAME OF CONTRACT | NAME OF CONTRACT0002 |
| CONTRACTOR | CONTRACTOR0002 |
| PERSON IN CHARGE OF CONTRACT | PERSON IN CHARGE OF CONTRACT0002 |
| DATE OF CONTRACT | 2003/01/01 |

1205

No.3
| | |
|---|---|
| | SELECT   PDF FILE DOWNLOAD |
| CLASSIFICATION | MASTER CONTRACT |
| NAME OF CONTRACT | NAME OF CONTRACT0003 |
| CONTRACTOR | CONTRACTOR0003 |

1206

1201
1202
1203

| CLASSIFICATION | ○ MASTER CONTRACT<br>○ MEMORANDUM<br>○ SPECIFICATIONS |
|---|---|
| ORDER ACCEPTANCE CONTRACT | -- PLEASE SELECT -- ▽ |
| ORDER CONTRACT | -- PLEASE SELECT -- ▽ |
| HIRE | -- PLEASE SELECT -- ▽ |
| LEASE | -- PLEASE SELECT -- ▽ |
| INDIRECT SECTION CONTRACT | -- PLEASE SELECT -- ▽ |
| NAME OF CONTRACT | |
| CONTRACTOR | |
| NAME OF ITEM | |
| PERSON IN CHARGE OF CONTRACT | |
| DATE OF CONTRACT | ~ |
| FULL TEXT RETRIEVAL | |
| DISPLAY | THUMBNAIL MODE ○<br>STANDARD MODE ◉<br>LIST MODE ○ |

1401
( RETRIEVE )

FIG.14

DISPLAY FILE TABLE

| CONTRACT SEQNUMBER | PARENT CONTRACT SEQ NUMBER | RETRIEVAL FLAG |
|---|---|---|
| 1 | NULL | 1 |
| 2 | 1 | 1 |
| 3 | 2 | 1 |
| 4 | 2 | 1 |
| 5 | 1 | 1 |

FIG.15

DISPLAY FILE RELATION DATA TABLE

| CONTRACT SEQ NUMBER | DISPLAY RELATION CODE |
|---|---|
| 1 | 1 |
| 2 | 1-1 |
| 3 | 1-1-1 |
| 4 | 1-1-2 |
| 5 | 1-2 |

FIG.16

RELATION OF DISPLAY POSITION AND DISPLAY DATA

| MATRIX (m,n) | CONTRACT SEQ NUMBER RELATED COMPONENT FILE |
|---|---|
| (1,1) | 1 |
| (2,1) | 01 |
| (3,1) | 2 |
| (4,1) | 06 |
| (5,1) | 3 |
| (1,2) | NULL |
| (2,2) | 03 |
| (3,2) | NULL |
| (4,2) | 06 |
| (5,2) | 4 |
| (1,3) | NULL |
| (2,3) | 06 |
| (3,3) | 5 |
| (4,3) | NULL |
| (5,3) | NULL |

FIG.18

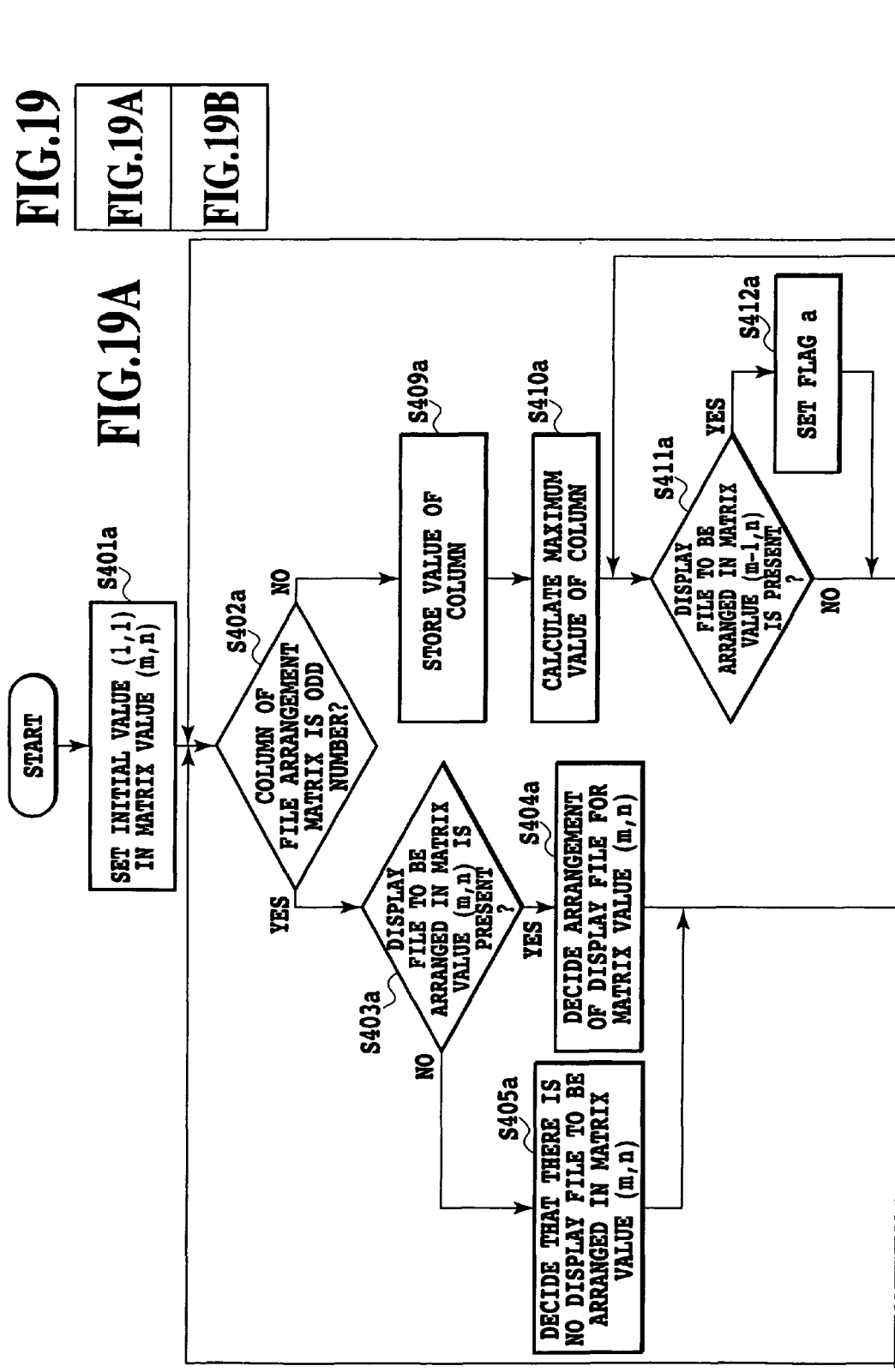

| CONTRACT SEQ NUMBER | PARENT CONTRACT SEQ NUMBER |
|---|---|
| 1 | NULL |
| 2 | 1 |
| 3 | 1 |
| 4 | NULL |

FIG.22

| CONTRACT SEQ NUMBER | PARENT CONTRACT SEQ NUMBER |
|---|---|
| 1 | NULL |
| 2 | 4 |
| 3 | 1 |
| 4 | 1 |

FIG.23

| CONTRACT SEQ NUMBER | PARENT CONTRACT SEQ NUMBER |
|---|---|
| 1 | NULL |
| 2 | 1 |
| 3 | 2 |
| 4 | 1 |
| 4 | 7 |
| 5 | 4 |
| 6 | 4 |
| 7 | NULL |

FIG.26

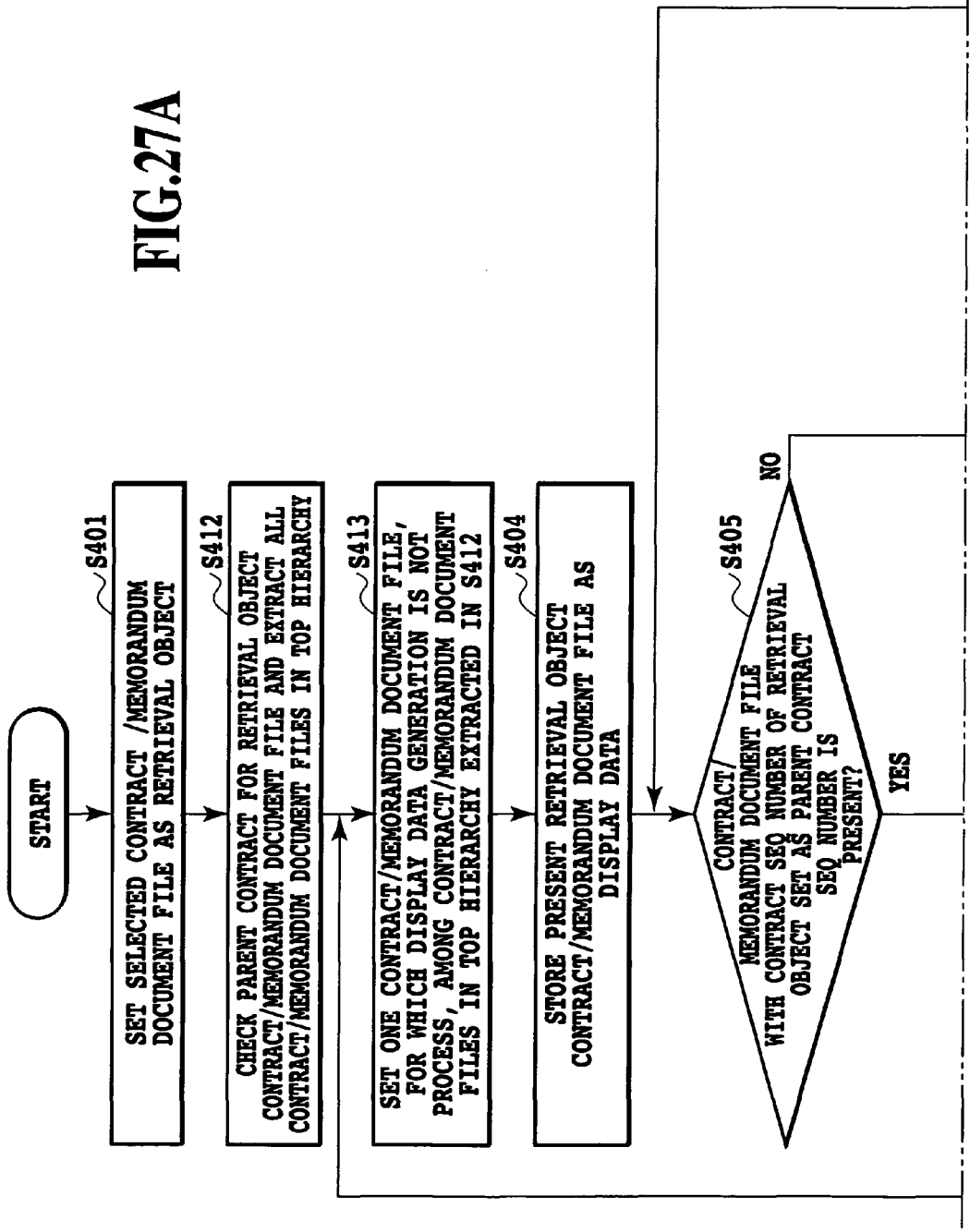

| DISPLAY BLOCK | CONTRACT SEQ NUMBER | PARENT CONTRACT SEQ NUMBER | RETRIEVAL FLAG |
|---|---|---|---|
| 1 | 1 | NULL | 1 |
| 1 | 2 | 1 | 1 |
| 1 | 3 | 2 | 1 |
| 1 | 4 | 1 | 1 |
| 1 | 5 | 4 | 1 |
| 1 | 6 | 4 | 1 |
| 2 | 7 | NULL | 1 |
| 2 | 4 | 7 | 1 |
| 2 | 5 | 4 | 1 |
| 2 | 6 | 4 | 1 |

FIG.28

| DISPLAY BLOCK | CONTRACT SEQ NUMBER | DISPLAY RELATION CODE |
|---|---|---|
| 1 | 1 | 1 |
| 1 | 2 | 1-1 |
| 1 | 3 | 1-1-1 |
| 1 | 4 | 1-2 |
| 1 | 5 | 1-2-1 |
| 1 | 6 | 1-2-2 |
| 2 | 7 | 2 |
| 2 | 4 | 2-1 |
| 2 | 5 | 2-1-1 |
| 2 | 6 | 2-1-2 |

FIG.29

GENERATING A RELATION DIAGRAM OF DATA FILES

FIELD OF THE INVENTION

The present invention relates to an apparatus for managing data files, a data file managing method, and a program, and in particular to an apparatus for managing data files, a method for managing data files, and a program for managing electronic data file, on a management server through a network.

BACKGROUND OF INVENTION

A problem of how to efficiently manage a large quantity of documents, which are prepared in businesses, has been tried and discussed in many situations. In particular, in recent years, since an increase in a capacity and a reduction in cost of a hard disk have advanced and a data compression technology has advanced, documents such as papers are scanned to be converted into electronic data as PDF files, and stored and managed in a form of data files.

In the management of the data files, since some files have meaning concerning contents thereof among the files (e.g., a master contract, a supplemental contract, and a memorandum), it is important find how to associate such a relation to manage the files.

Conventionally, several mechanisms for allowing a user to perform management while visually showing a relation among data files in management of the data files have been provided. For example, in an operating system (OS) such as Windows (registered trademark), folders storing data files are hierarchically displayed according to directory management. Thus, the OS has a mechanism for making it easy to visually understand a relation among the folders to make it possible to display locations where the data files are present.

In addition, Japanese Patent Laid-open No. 2001-043231 discloses a file management system that has a mechanism for displaying locations where searched files are present in a form of a tree.

Japanese Patent Laid-open No. 9-185660 discloses a file management system that is capable of managing an input file, which is used for generating a specific file, and an output file, which is outputted from the specific file, in association with the specific file and generating a relationship diagram of the files.

However, in the file management system having a mechanism for displaying locations where searched file are present in a form of a tree described in Japanese Patent Laid-open No. 2001-043231, storage locations where files are present are hierarchically displayed and managed but it is unclear what kind of association the files have.

Concerning the tree display method, when storage locations of a low-order hierarchy (e.g., folders) are included in a storage location of a high-order hierarchy (e.g., a cabinet), "+" is displayed and, when "+" is designated, names of the storage locations of the low-order hierarchy included therein are displayed as a list in the same hierarchy, whereby tree structure display is performed. Thus, the tree display method does not make it possible to display files in association with each other.

Moreover, conventionally, although a result of file search is indicated by tree display, since the tree display itself is generated from information on paths where files are present, it is impossible to generate a tree dynamically to change displayed data.

In the file relationship diagram output method disclosed in Japanese Patent Laid-open No. 9-185660, although it is possible to display files in association with each other, a relationship diagram concerning files in a level above a designated file and files of a level below the designated file is outputted. Therefore, when plural files are managed hierarchically, if it is unknown in which hierarchy a designated file is located, it is impossible to display all related files including the designated file in a form of a tree.

In addition, in another viewpoint, Japanese Patent Laid-open No. 2001-043231 and Japanese Patent Laid-open No. 9-185660 does not assume a case in which the file management systems are applied to a Web system. Thus, since it is necessary to generate HTML data in order to perform tree structure display, image files of GIF, JPEG, and the like prepared in advance are required to be combined. However, the conventional techniques do not disclose generation of such HTML files for display.

SUMMARY OF THE INVENTION

The invention has been devised to solve the problems described above and it is an object of the invention to provide an apparatus for managing data files and a method for managing data files for allowing a user to visually understand a relation among data files.

Moreover, it is also directed to the invention to provide a data management apparatus and a data management method for allowing a user to confirm registration locations by visually displaying associated destinations in registering data files.

In order to solve the above problems, An apparatus for managing data files of the invention is characterized by including: a data base that includes plural data files and association information for associating the plural data files with one another; and a retrieving unit including a searching unit for searching, when a predetermined data file among the plural data files is designated, a data file to be a center of association including the predetermined data file using the association information and an extracting unit for extracting a data file group associated with the data file to be a center using the association information. The apparatus is characterized by further including: a communicating unit for performing communication with a computer apparatus through a network; a designating instructing unit for instructing, when designation of the predetermined data file is received from the computer apparatus through the communicating unit, the retrieving unit to retrieve the data file; and a retrieval result output unit for transmitting information on the data file group extracted by the retrieval unit to the computer apparatus through the communicating unit in a predetermined format. The apparatus is characterized in that the association information includes information on data files that are located hierarchically above the respective plural data files associated with one another hierarchically and the data file to be a center is a root of the associated data file groups.

A method for managing data files of the invention is characterized by including: storing association information, which associates respective plural data files with one another, in a data base including the plural data files; and retrieving, when a predetermined data file among the plural data files is designated by a searching unit, searching for a data file to be a center of association including the predetermined data file using the association information and, then, extracting a data file group associated with the data file to be a center with an extracting unit using the association information.

An apparatus for managing data files of the invention is characterized by including: a data base that includes plural data files and association information associating the respective plural data files; a display pattern storing unit for storing a two-dimensional display pattern in which a data file information display section, in which data file information concerning respective data files of a data file group associated with one another by the association information is displayed, and a relation indication section, in which a relation between the displayed data file information and the respective data files adjacent to one another is displayed, is arranged; a data file arrangement determining unit for determining positions where data file information of the respective data files of the data file group associated with one another using the association information are displayed; a relation indication determining unit for determining a relation indication that is displayed on the relation indication section using the association among the adjacent data files in the determined positions; and an information image generator for generating an image for displaying information related to the plural data files by arranging the data file information of the respective data files in the positions determined by the data file arrangement determining unit of the two-dimensional display pattern read out from the display pattern storing unit and arranging the relation indication determined by the relation indication determining unit in the two-dimensional display pattern. The apparatus is characterized in that, in the two-dimensional display pattern, the data file information display section and the relation indication section are arranged alternately. In addition, the apparatus is characterized in that the information image generator generates an image for displaying information related to plural data files with a format, which can be displayed on a browser in a client apparatus, and the data file information is a JPEG file.

A method for managing data files of the invention is characterized by including: storing plural data files and association information associating the respective plural data files in a database; generating a two-dimensional display pattern by arranging a data file information display section, in which data file information concerning the respective data files of a data file group associated with one another by the association information is displayed, and a relation indication section, in which a relation between the displayed data file information and data files adjacent to one another is displayed, and storing the two-dimensional display pattern in a display pattern storing unit; determining positions, where the data file information of the respective data files of the data file group associated with one another using the association information, with a data file arrangement determining unit; determining a relation indication, which is displayed on the relation indication section using the association among the adjacent data files in the determined positions, with a relation indication determining unit; and reading out the two-dimensional display pattern from the display pattern storing unit and generating an image for displaying information related to the plural data files by arranging the data file information of the respective data files in the positions determined by the data file arrangement determining unit of the two-dimensional display pattern and arranging the relation indication determined by the relation indication determining unit in the two-dimensional display pattern with an information image generator.

An apparatus for managing data files of the invention is characterized by including: a data storing unit for storing plural data files, data file images representing the respective plural data files, plural relation indication images representing a relation among the data files, and association information associating the respective plural data files; a retrieving unit including a determining unit that, when a predetermined data file among the plural data files is designated, determines a data file to be a center of association including the predetermined data file using the association information and an extracting unit that extracts a data file group associated with the data file to be a center using the association information; a selector for selecting a relation indication image to be used among adjacent data files on the basis of the association information of the data files included in the extracted data file group in order to represent a tree structure of the data files formed by arranging the data file to be a center of association in an uppermost layer; and a generator, which generates data file relation indication data representing a relation among the data files, including a position determining unit for determining display positions of data file images representing the respective data files of the extracted data file group and the selected relation indication image files. The apparatus is characterized in that the data files are image data generated by converting a document into an electronic form, the data file images are thumbnail images consisting of JPEG data generated by converting a part of the document into an electronic form, and the data file relation indication data is HTML data. The apparatus is characterized in that at least one of the relation indication images is constituted by an image set consisting of plural images. The apparatus is characterized in that the association information is information for specifying data files located one hierarchy above the respective plural data files associated with one another hierarchically and the data file to be a center is a data file that does not have information for specifying data files. The apparatus is characterized in that the generator is characterized by further including a code generator for generating a relation indication code for representing a tree structure using the association information of the extracted data file group and in that the selector and the position determining unit use the relation indication code. The apparatus is characterized in that the relation indication image includes an additional position display image for representing a position where a data file can be added to the tree structure and the apparatus includes: an additional information receiver for receiving additional file information for specifying the data file to be added and additional position information for specifying a position of the additional position display image; and an association information updating unit for updating association information of data files adjacent to the position specified by the additional position information on the basis of the additional file information and the additional position information. The apparatus is characterized in that the association information is information for specifying a data file located one hierarchy above the respective plural data files associated with one another hierarchically and the association information updating unit performs update of the association information by setting the association information of the data file to be added as information for specifying a data file located in a high-order hierarchy of data files adjacent to the position specified by the additional position information and setting the association information of a data file located in a low-order hierarchy of the data files adjacent to the position specified by the additional position information as information specifying the data file to be added. The apparatus is characterized by further including: an update instruction receiver for receiving update instruction information for the association information; and an update controller that, when an update instruction is received, generates updated data file relation indication data by operating the association information updating unit to update the association information and operate the generator. The apparatus is characterized in that the association information is stored in a data storing unit in a form in which plural pieces of the association information can be provided for one data file. The apparatus is characterized in that, when the determining unit determines that there are plural data files to be a center of association including the predetermined data file, the position determining unit determines display positions of data file images and relation indication images so as to generate plural tree structures.

A method for managing data files of the invention is characterized by including: storing data including plural data files, data file images representing the respective plural data files, plural relation indication images representing a relation among the data files, and association information associating the respective plural data files; retrieving including, when a predetermined data file of the plural data files is designated, determining a data file to be a center of association including the predetermined data file using the association information and extracting a data file group associated with the data file to be a center using the association information; selecting a relation indication image to be used between adjacent data files on the basis of the association information of data files included in the extracted data file group in order to represent a tree structure of data files formed by arranging the data file to be a center of association in a top hierarchy; and generating data file relation indication data representing a relation of data files including a position determining of determining display positions of data file images representing the respective image files of the extracted data file group and the selected relation indication image files. The method for managing data files is characterized in that the association information is stored in a data storing unit in a form in which plural pieces of the association information can be provided for one data file and, when it is determined in the determining that there are plural data files to be a center of the association including the predetermined data file, the position determining determine display positions of the data file images and the relation indication images so as to generate plural tree structures. The method for managing data files is characterized in that the generating is characterized by further including a code generating of generating a relation indication code for representing a tree structure using the association information of the extracted data file group and in that the relation indication code is used in the selecting and the position determining. The method for managing data files is characterized in that the relation indication image includes an additional position display image for representing a position where a data file can be added to the tree structure and the method for managing data files includes: receiving of receiving additional file information for specifying a data file to be added and additional position information for specifying a position of the additional position display image; and updating association information of a data file adjacent to the position specified by the additional position information on the basis of the additional file information and the additional position information. The method for managing data files is characterized by including: updating instruction information for the association information; and controlling, when an update instruction is received, executing the association information update step to update the association information and executing the generating to thereby generate updated data file relation indication data. The method for managing data files is characterized in that the storing is storing the association information in a form in which plural pieces of the association information can be provided for one data file and the determining is, when it is determined in the determining that there are plural data files to be a center of the association including the predetermined file, determining display positions of the data file image and the relation indication image so as to generate plural tree structures.

An apparatus for managing data files of the invention is characterized by including: a data storing unit that includes plural data files and association information associating the respective plural data files with one another hierarchically; and an association information update unit that, when information instructing release of association with a predetermined data file among the plural data files is received, deletes the association information for associating the predetermined data file and a data file one hierarchy above the predetermined data file.

A method for managing data files of the invention is characterized by including: storing plural data files and association information associating the respective plural data files with one another hierarchically in a data storing unit; and updating, when information instructing deletion of a predetermined data file among the plural data files is received, the association information with an association information updating unit by directly associating a data file one hierarchy above the predetermined data file and a data file one hierarchy below the predetermined data file.

A method for managing data files of the invention is characterized by including: storing plural data files and association information associating the respective plural data files with one another hierarchically in a data storing unit; and deleting, when information instructing release of association with a predetermined data file among the plural data files is received, the associating information for associating the predetermined data file and a data file one hierarchy above the predetermined data file with an association information updating unit.

An apparatus for managing data files of the invention is an apparatus for displaying plural data files in association with one another on the basis of data indicating a relation among the plural data files, characterized by including: a tree display data creating unit for generating data for performing hierarchical tree display indicating a relation of the plural data files; a selection data receiver for receiving selection data for selecting one of data files included in the tree display data; and a processing instruction receiver for receiving a processing instruction for the selected data file, and in that, when the processing instruction is an instruction for releasing association, tree display data, in which all data files present in a low hierarchy associated with the selected data file are deleted, is generated.

An apparatus for managing data files of the invention is an apparatus for displaying plural data files in association with one another on the basis of data indicating a relation among the plural data files, characterized by including: a tree display data creating unit for generating data for performing tree display indicating a relation of the plural data files; a selection data receiver for receiving selection data for selecting one of data files included in the tree display data; and a processing instruction receiver for receiving a processing instruction for the selected data file, and in that, when the processing instruction is an instruction for deleting the selected data file, tree display data, in which a data file located one hierarchy below the selected data file is directly associated with a data file to be a parent of the selected data file, is generated.

A method for managing data files of the invention is a method for displaying plural data files in association with one another on the basis of data indicating a relation among the plural data files, characterized by including: generating data for performing hierarchical tree display indicating a relation of the plural data files; receiving selection data for selecting one of data files included in the tree display data; and receiving a processing instruction for the selected data file, and in that, when the processing instruction is an instruction for releasing association, tree display data, in which all data files present in a low hierarchy associated with the selected data file are deleted, is generated.

A method for managing data files of the invention is a method for displaying plural data files in association with one another on the basis of data indicating a relation among the plural data files, characterized by including: generating data for performing tree display indicating a relation of the plural data files; receiving selection data for selecting one of data files included in the tree display data; and receiving a processing instruction for the selected data file, and in that, when the processing instruction is an instruction for deleting the selected data file, tree display data, in which a data file located one hierarchy below the selected data file is directly associated with a data file to be a parent of the selected data file, is generated.

Moreover, a program product may store a program for causing a computer to execute the methods of the invention in a computer readable medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a diagram showing a relation between FIG. 3A and FIG. 3B;

FIG. 3A and FIG. 3B are diagrams showing a flowchart for explaining the embodiment of the invention;

FIG. 6 is a diagram in which JPEG files of contracts in the embodiment and associated component indications are alternately arranged to show an HTML data file for display;

FIG. 9 is a diagram showing an example of a related information input screen in the embodiment;

FIG. 11 is a diagram showing an example of a retrieval screen in the embodiment;

FIG. 12 is a diagram showing an example of an association data retrieval list screen in the embodiment;

FIG. 14 is a diagram showing an example of a retrieval condition input screen in the embodiment;

FIG. 15 is a diagram showing an example of display data in the embodiment;

FIG. 16 is a diagram showing a relation between display data files having predetermined contract SEQ numbers and display relation codes;

FIG. 18 is a diagram showing an example of a relation between display matrix values and display files in the embodiment;

FIG. 19 is a flowchart showing a relation between FIG. 19A and FIG. 19B;

FIG. 19A and FIG. 19B are diagrams showing a flowchart for explaining an embodiment of the invention;

FIG. 22 is a diagram showing a contract association table 504 before the association in FIG. 21 of the embodiment;

FIG. 23 is a diagram showing the contract association table 504 after the association in FIG. 21 of the embodiment;

FIG. 26 is a diagram showing an example of the contract association table 504 in the embodiment;

FIG. 27 is a diagram showing a relation between FIG. 27A and FIG. 27B;

FIG. 27A and FIG. 27B are diagrams showing a flowchart for explaining an embodiment of the invention;

FIG. 28 is a diagram showing an example of display data in the embodiment;

FIG. 29 is a diagram showing a relation between display data files having predetermined contract SEQ numbers and display relation codes in the embodiment;

DESCRIPTION OF THE PREFERRED EMBODIMENTS

Preferred embodiment(s) of the present invention will be described in detail in accordance with the accompanying drawings.

In this embodiment, a management system for contract files is cited as an example. Data such as images of contracts are objects of the present invention. In general, respective contracts are associated with each other as in association between a master contract and a memorandum. In this embodiment, the association is processed to be represented by various tables (association processing) and used for management of data files. Data file of contracts are read from the contracts by a scanner or the like and stored in a database in a format such as PDF. In this case, it is also possible to set association among the contracts (new registration processing).

The data files are managed using association information that is set in this way. First, on the basis of the association information among the respective data files, a group of data files associated with one another by the association is generated (generation of a group of data files associated with one another). Thereafter, a display image is generated such the data file group is visualized and displayed to make the association among the respective data files clear (generation of a relation diagram display file). The display image obtained in this way is transmitted to a personal computer or the like of a user and displayed on a screen of the personal computer.

In particular, as a best mode in the invention, it is assumed that tree display is performed in a form of an HTML file in order to make it possible to inspect data files in a Web system. In other words, a relation indication for representing a tree relation (e.g., a straight line connecting files or a notation of a T shape) is generated in advance as a file of JPEG or GIF and it is dynamically determined which a relation indication is arranged in which position according to a relation among files to constitute an HTML file. This makes display in a general-purpose browser possible.

(System Configuration of this Embodiment)

Figure 1:
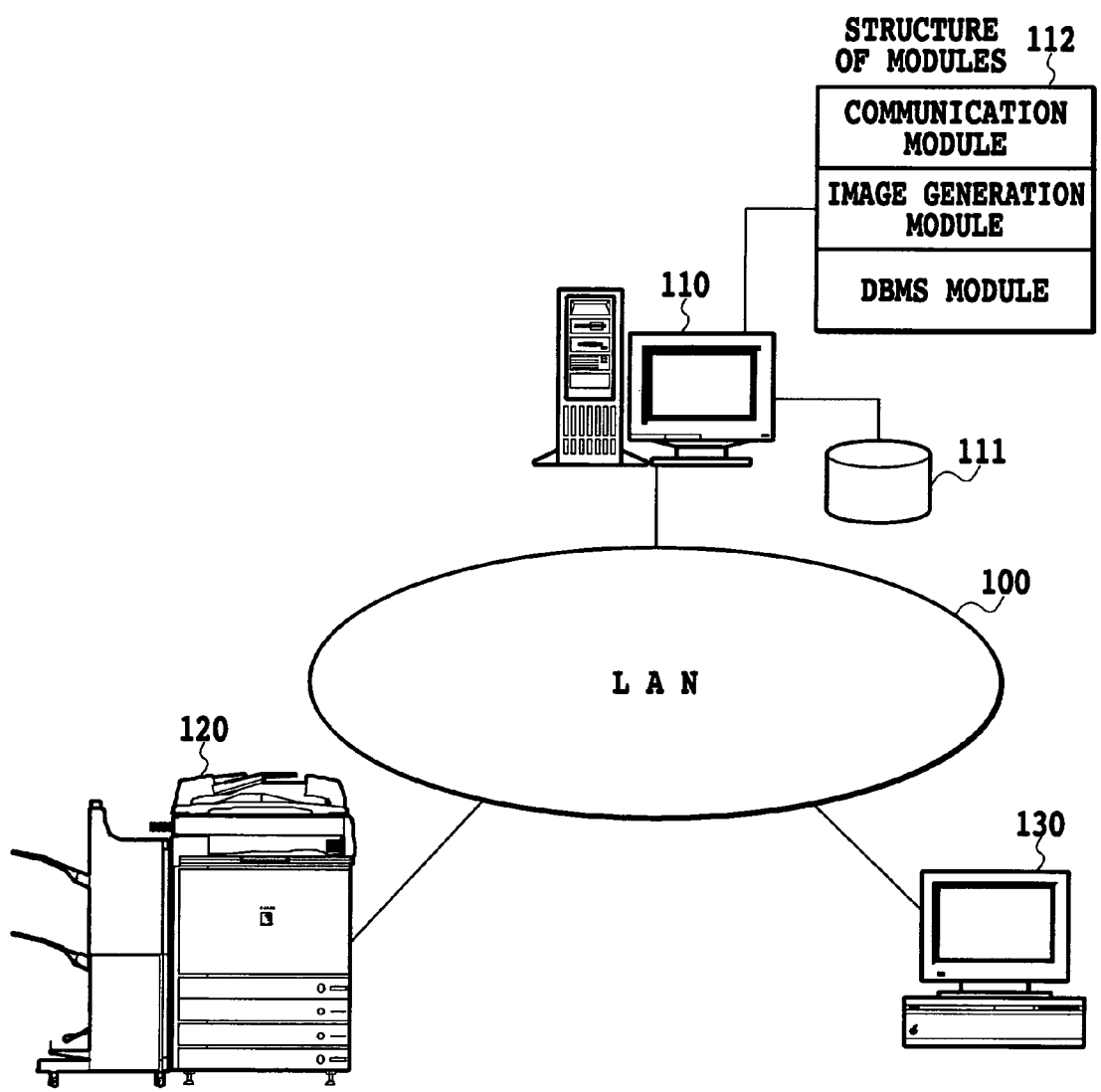
FIG. 1 is a diagram showing a configuration of a data file management system according to an embodiment of the invention.

FIG. 1 is a diagram showing a configuration of a data file management system according to an embodiment of the invention. Note that it is needless to mention that the configuration of various terminals connected on a network 100 in FIG. 1 is only an example and various examples of configuration are possible according to applications and purposes. The network 100 is constituted by a LAN having an environment in which communication is possible with a protocol of TCP/IP. A data file management server 110 stores electronic data files and also stores management data for managing related information of the respective data files and association data among the data files. The data file management server 110 also has a function as a Web server and is constituted to be capable of performing processing for responding to an access that is performed according to an http protocol from a PC 130 serving as a client apparatus using a general-purpose browser. Moreover, the data file management server 110 is also capable of receiving electronic data from a multifunction product 120, which has an electronic data generating function for reading, for example, a print or a photograph with a scanner to generate image data or a network transmission function, saving the electronic data in a predetermined storage location, and serving the electronic data to various uses. In addition, the data file management server 110 also has a function for, after receiving a PDF file or the like, converting the received PDF file into a JPEG image for display that is used when the Web server generates display data.

The multifunction product 120 has an original scanning function, a PDF file creating function for scan data, a file transfer function using a SMB (Server Message Block) or the like, and the like. According to an instruction of an operator, the multifunction product 120 executes a series of flow of scanning an original, converting the original into an electronic form and, at the same time, generating a file such as a PDF file, and transferring the file to a storage location (a folder) set in advance.

The PC 130 is a general-purpose PC used by a user. The PC 130 has a communication function for making it possible to communicate with the data file management server 110 in two ways and a general-purpose browser application and is capable of communicating with the data file management server 110 with an http protocol. For the two-way communication, the general-purpose browser has a function such as transmission of CGI parameter information.

Figure 2:
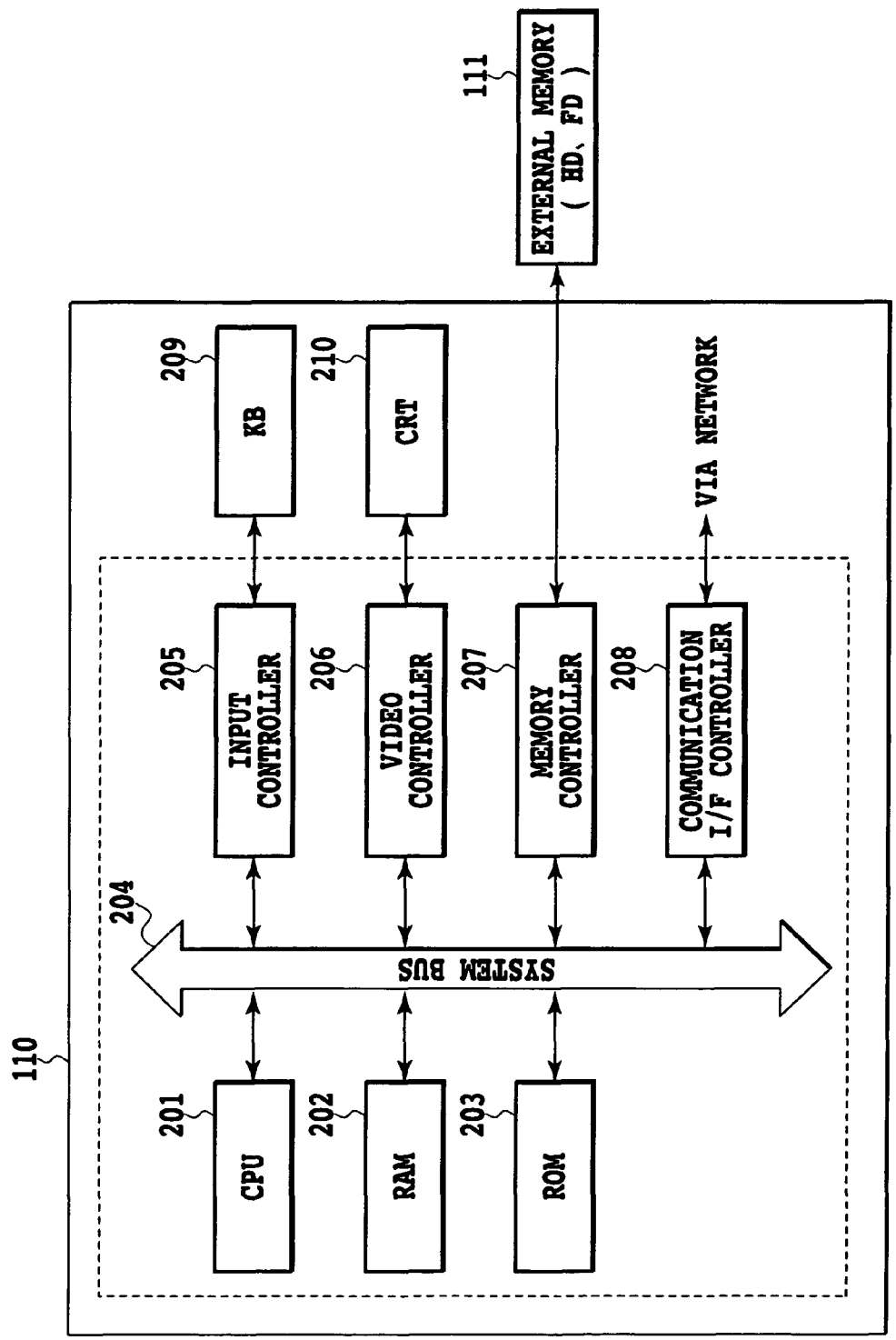
FIG. 2 is a diagram showing a hardware structure of a management server apparatus according to the embodiment of the invention.

Next, a hardware structure of the data file management server 110 and the PC 130 of the invention explained in FIG. 1 will be explained with reference to FIG. 2. FIG. 2 is a diagram showing a hardware structure of the data file management server 110 according to the embodiment of the invention. In FIG. 2, a CPU 201 collectively controls respective devices connected to a system bus 204. An operating system (OS) serving as a control program for the CPU 201 and programs for realizing various functions to be described later of respective servers or respective clients are stored in a ROM 203 or an external memory 111.

A RAM 202 is used as a main memory, a work area, a temporary storing area, and the like for the CPU 201. An input controller 205 controls an input from an input unit 209. In particular, in apparatuses such as a server and a client, examples of this input unit 209 include pointing devices such as a keyboard and a mouse. In addition, in a printing apparatus such as the multifunction product 120, examples of this input unit 209 include a touch panel, a button, and a switch.

A video controller 206 controls display of a display unit 210. Examples of the display unit 210 include a CRT and a liquid crystal. An external memory controller (MC) 207 controls access to the external memory 111 that stores a boot program, various applications, font data, user files, edit files, printer drivers, and the like. In addition, it is also possible that the external memory controller 207 also has functions databases stored in various tables and parameters including association data for realizing various functions of the servers and the clients. Examples of this external memory 111 include a hard disk (HD), a floppy (registered trademark) disk (FD), a compact flash (registered trademark) that is connected to a PCMCIA card slot through an adapter, and a smart medium.

A communication I/F controller 208 executes control processing for communication with an external apparatus through the network 100. More specifically, the communication I/F controller 208 transmits data to a partner apparatus through the network and receives data from other apparatuses connected to the network.

A control program for realizing the invention is stored in the external memory 111 and is loaded to the RAM 202 as required and executed by the CPU 201. Data files 213 and various information tables 214, which are used in a control program 212 related to the invention, are also stored in the external memory 111. Detailed explanations about these data files and tables will be described later.

The above explanation centers on the data file management server 110. Since the PC 130 serving as a general-purpose personal computer basically has the same structure as the management server, the structure of the PC 130 is not explained. Basically, any personal computer can attain the object of the invention as long as the personal computer has a general-purpose browser, communicates with the data file management server 110 through an NIC to display an image, and has a mouse and a keyboard for inputting an instruction.

Next, a basic processing flow of an embodiment of the data file management system of the invention will be explained with reference to FIGS. 3 and 4. In this embodiment, it is assumed that data files such as PDF data generated by scanning in the multifunction product 120 are stored in a specific management location of the data file management server 110 in advance, and JPEG image for display is stored in association with the respective data files by an image converting function provided in the data file management server 110.

Management objects in this embodiment are contracts and data files are image data of the contracts. Contract to be objects are, for example, contracts like contracts related to a real estate business in which plural contracts are present and a relation among the contracts is complicated. Therefore, when management for the contracts is performed, the management is performed on the basis of association among data files that are electronic data files of the contracts. As the contracts in this embodiment, there are a "master contract" and a "supplemental contract" and a "memorandum" associated with the master contract. It is an object of the invention to visually manage association among the master contract and the supplemental contract and the memorandum.

(Explanation about Respective Tables)

Figure 5:
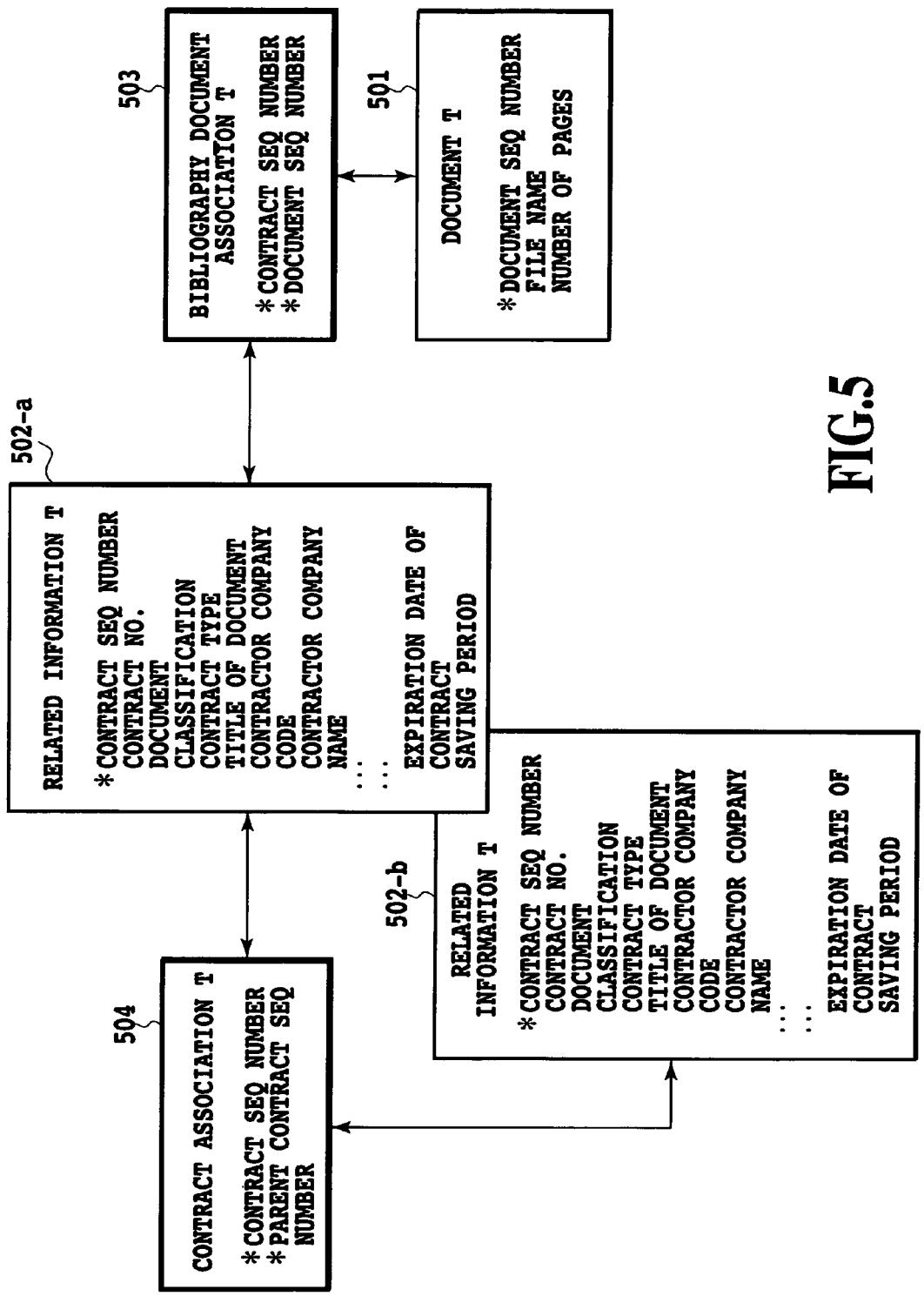
FIG. 5 is a conceptual diagram of various associated tables for performing association among contracts according to the embodiment.

Before explaining a processing flow in detail, first, outlines of respective information tables required for the explanation of the processing flow and a relation diagram thereof will be explained with reference to FIG. 5. FIG. 5 is a conceptual diagram of associated tables for performing association among contracts according to this embodiment.

In FIG. 5, items with a mark * are main keys of the respective tables. Here, reference numeral 501 denotes a "document table" that is prepared for respective data files when the data files are stored in the data file management server 110 for the first time. As items, the "document table" 501 includes a document SEQ number serving as a sequence number and a file name serving as a name of a data file itself. PDF data, which is the data file, and JPEG for display, which is display data at the time when the data file is displayed, are internally associated with each other so as to be affixed an identical document SEQ number and distinguished by extensions.

A table 502 is a "related information table" for the respective data files. Tables 502-*a* and 502-*b* indicates related information records for different data files, respectively, and are managed with contract SEQ numbers as main keys. A table 503 is a "related info/document association table" that associates the respective main keys in order to associate the "document table" 501 and the "related information table" 502. In addition, a table 504 is a "contract association table" that indicates a parent-child relation by describing association of the main keys of the related information in order to associate contracts and memoranda. As items, the table 504 is constituted by a contract SEQ number and a parent contract SEQ number thereof. If the parent contract SEQ number is NULL, a contract is like a master contract without any hierarchy above the contract. A data file of the contract SEQ number should only be displayed in a top hierarchy of a relation diagram, for example, shown in FIG. 13. As association information, the contract association table 504 has only information for specifying a data file one hierarchy above the data file. Thus, since only an amount of information smaller than an amount of information including file path information as in other systems is required, it is possible to control an amount of data.

In the following explanation, respective steps are stored in the external memory 111 of the data file management server 110 as control programs, and the CPU 201 loads these programs in the RAM 203 and executes the programs. First, a user accesses a URL set in the data file management server 110 using the PC 130 to thereby receive a not-shown login screen from the data file management server 110 and display contents of the login screen with a browser. Next, the PC 130 requests the management server 110 to perform authentication using a user ID, a password, and the like.

In step S301, the data file management server 110 determines whether authentication has been successful using a not-shown user master table (which stores user IDs and passwords of users). If the authentication has been successful, the data file management server 110 shifts to S302. In step S302, the data file management server 110 transmits a main menu screen shown in FIG. 7 to the PC 130. The PC 130 displays a main menu in FIG. 7 on a browser.

Figure 7:
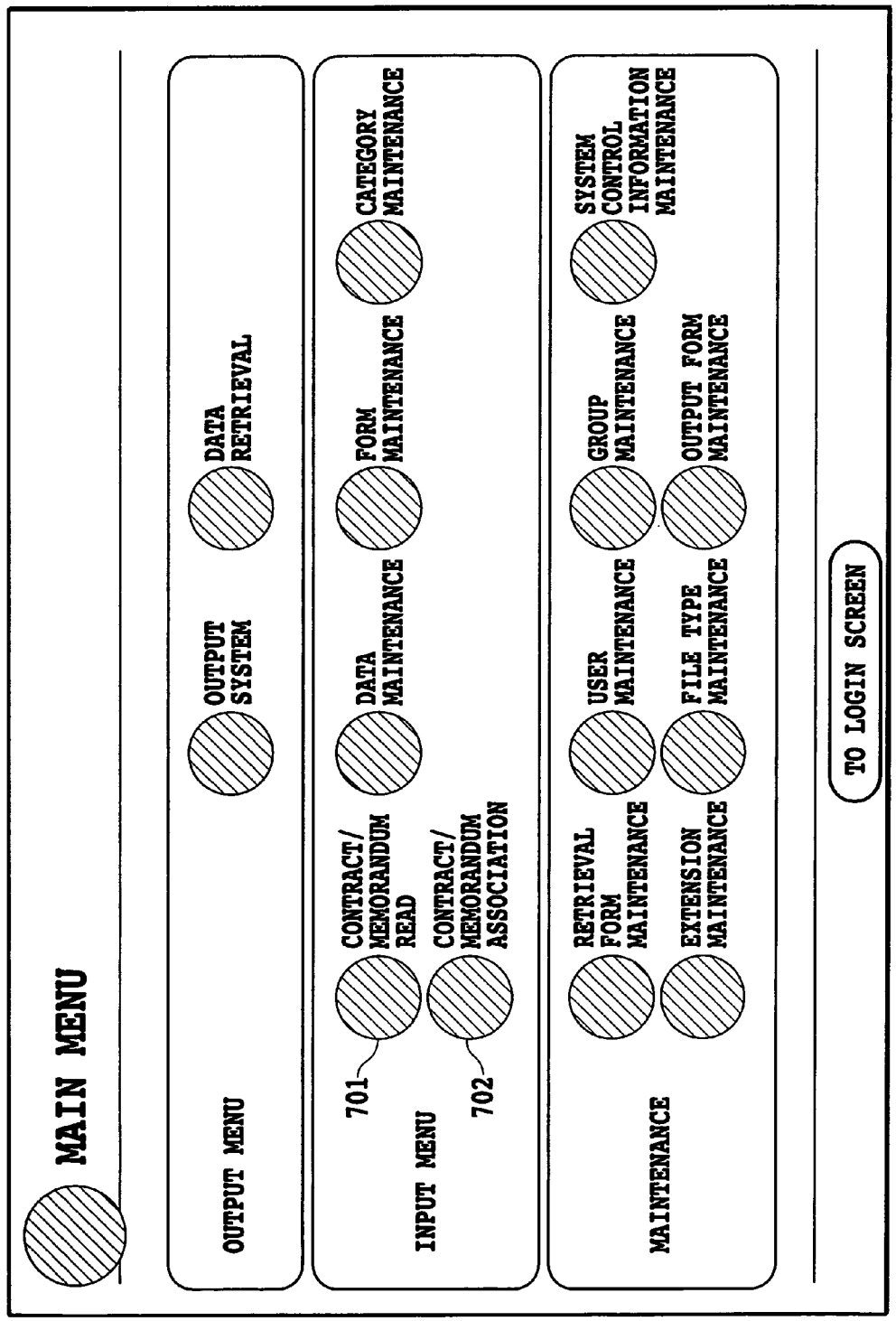
FIG. 7 is a diagram showing a main menu that is displayed on a browser of a PC of a user in the embodiment.

In the main menu shown in FIG. 7, there is display of function buttons for an output menu, an input menu, and maintenance. However, only a "CONTRACT/MEMORANDUM document read" button 701 and a "CONTRACT/MEMORANDUM document association" button 702 of the input menu related to the invention will be explained. The "CONTRACT/MEMORANDUM document read" button 701 is used for new registration. This means registration of a document in a state of a data file or the like for which input of related information or the like has not been finished and a data file from the multifunction product 120 and JPEG display data are generated and which has only a document SEQ number automatically generated sequentially so as not to be redundant as a document number. Here, the PDF data file and the JPEG file for display thereof (hereinafter referred to as data file and the like) are affixed an identical document SEQ number and distinguished by extensions.

The "CONTRACT/MEMORANDUM document association" button 702 is used for association. This is used in performing association of data files, for which various kinds of information such as related information have already been registered and only association has not been set, or a change of association for data files in a state in which association with other data files have been made.

Returning to the explanation of the processing flow, in S303, the CPU 201 of the data file management server 110 determines whether information, which indicates that the "CONTRACT/MEMORANDUM document read" button 701 is depressed, is sent to the CPU 201. Here, if the "CONTRACT/MEMORANDUM document read" button 701 is depressed, the CPU 201 considers that new input is performed and shifts to step S317 to be described later. If the "CONTRACT/MEMORANDUM document read" button 701 is not depressed (No in S303), in step S304, the CPU 201 determines whether the "CONTRACT/MEMORANDUM document association" button 702 is depressed. Here, button depression information is determined according to contents of reception or the like of CGI (URL information). If the button depression information is not received in step S304 (No in step S304), the CPU 201 performs other processing.

(Association Processing)

If the "CONTRACT/MEMORANDUM document association" button 702 is depressed in step S304, the CPU 201 considers that association is to be performed and, in step S305, transmits a retrieval condition input screen shown in FIG. 14 to the PC 130 through the communication I/F controller 208. Thereafter, in step S306, when the CPU 201 receives information indicating that a retrieval condition and retrieval instruction button 1401 is depressed, in step S307, the CPU 201 retrieves data corresponding to the data file stored in the external memory 111 according to the inputted retrieval conditions. Then, in step S308, the CPU 201 generates a retrieval result screen and transmits an association data retrieval list (e.g., a result list shown in FIG. 12) to the PC 130. In FIG. 12, reference numerals 1201 to 1203 indicate JPEG files for display displayed on the browser and 1204 to 1206 denote selection buttons for selecting data files to be subjected to association.

Then, in step S309, the CPU 201 analyzes reception information from the PC 130 and determines presence or absence of selection instruction input to thereby determine object data files to be subjected to association. In other words, if selection instruction is inputted in step S309, the CPU 201 determines which data file is selected according to a CGI parameter thereof. Here, it is assumed that CGI parameters are associated with the buttons 1204 to 1206 of the image data generated in step S308.

Next, in this state, in the next step S310, the CPU 201 transmits a screen (e.g., a retrieval screen shown in FIG. 11) in which retrieval conditions for retrieving a data file of an association destination are inputted. In step S311, the CPU 201 determines which input information is inputted in respective input spaces in FIG. 11 and whether information instruction execution of retrieval is inputted. If the information is inputted (Yes in S311), the CPU 201 performs data retrieval as in step S307, generates a retrieval result screen in a list format shown in FIG. 12, and transmits the retrieval result to the PC 130 (step S312).

In step S313, the CPU 201 determines presence or absence of selection instruction for a data file to be an association destination in the same processing as S309 and, if the selection instruction is inputted (Yes in S313), shifts to step S314. Next, in step S314, the CPU 201 generates a display file for displaying a relation diagram concerning the data file selected in step S313. This generation processing for a relation diagram display file will be described later using the processing flow in FIG. 4.

Figure 13:
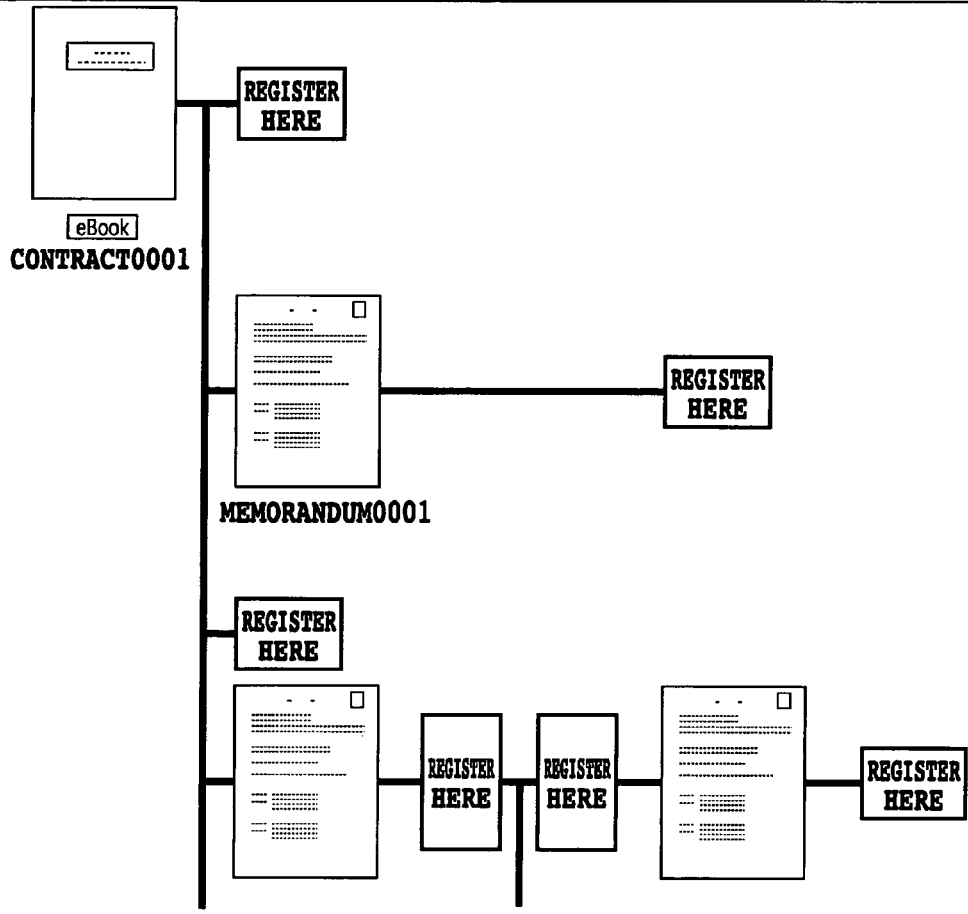
FIG. 13 is a diagram showing an example of association position information according to an embodiment of the invention.

The relation diagram display file generated and transmitted in step S314 is received by the PC 130 and displayed on a screen thereof (e.g., as association position information in FIG. 13). The user inputs information indicating a position for association looking at an image on the screen. In step S315, the CPU 201 determines if association data is inputted and, if the association data is inputted, updates information in the contract association table 504, for example, as shown in FIG. 5 using information of the association data.

(New Registration Processing)

Here, processing in the case of Yes in the determination in step S303, that is, the case of "new data file registration" will be explained. The user inputs related information concerning the data files and the display JPEG files, which have already been registered as data files and the like, and performs association of the files.

Figure 8:
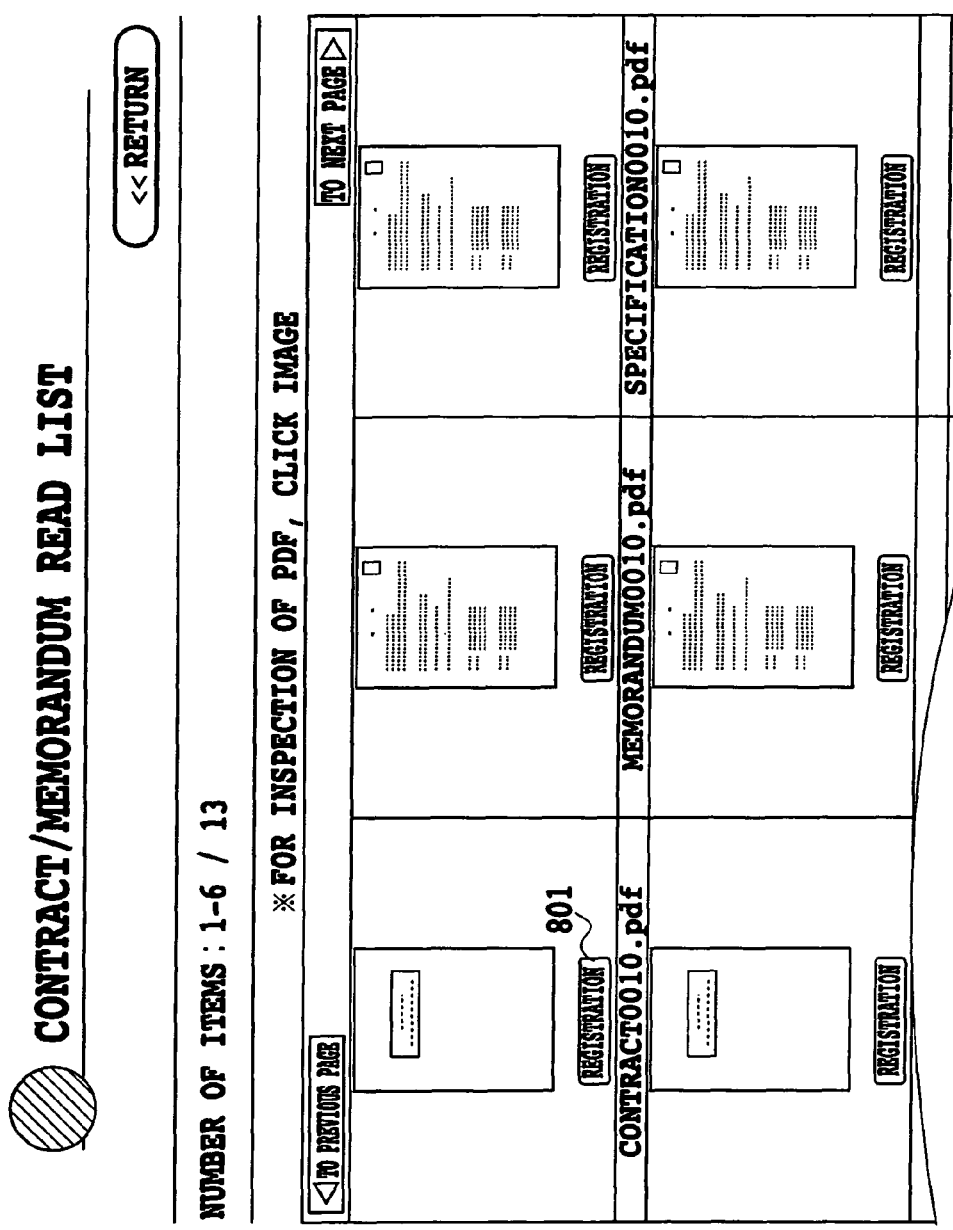
FIG. 8 is a diagram showing a data file list screen in the embodiment.

First, in step S317, the CPU 201 operates to transmit display data of a data file list screen (e.g., the list screen shown in FIG. 8) to the PC 130. Concerning data files for which related information is not registered yet in FIG. 8 and which is registered only in a document table, the CPU 201 transmits data including information capable of displaying a display screen, on which JPEG images for display for performing display of the data files, with the browser. In the PC 130, when the user depresses a registration button 801 while inspecting the screen, the management server 110 receives information transmitted by, for example, a browser application, the CPU 201 thereof determines contents of the information (step S318) and transmits a related information input screen (e.g., shown in FIG. 9) (step S319). Here, a PDF image of a designated data file is arranged beside an input section of related information in an identical frame such that information to be inputted can be obtained directly from PDF data. Consequently, it is possible to input information more easily and surely.

Thereafter, the CPU 201 determines whether related information and registration instruction information should be received (step S320). The CPU 201 automatically generates a contract SEQ number when related information and registration instruction are received (Yes in S320), creates a new record in the related information table 502, performs registration processing for associating the related information table 502 with the related info/document association table, and transmits a registration end screen shown in FIG. 10 (step S321).

Figure 10:
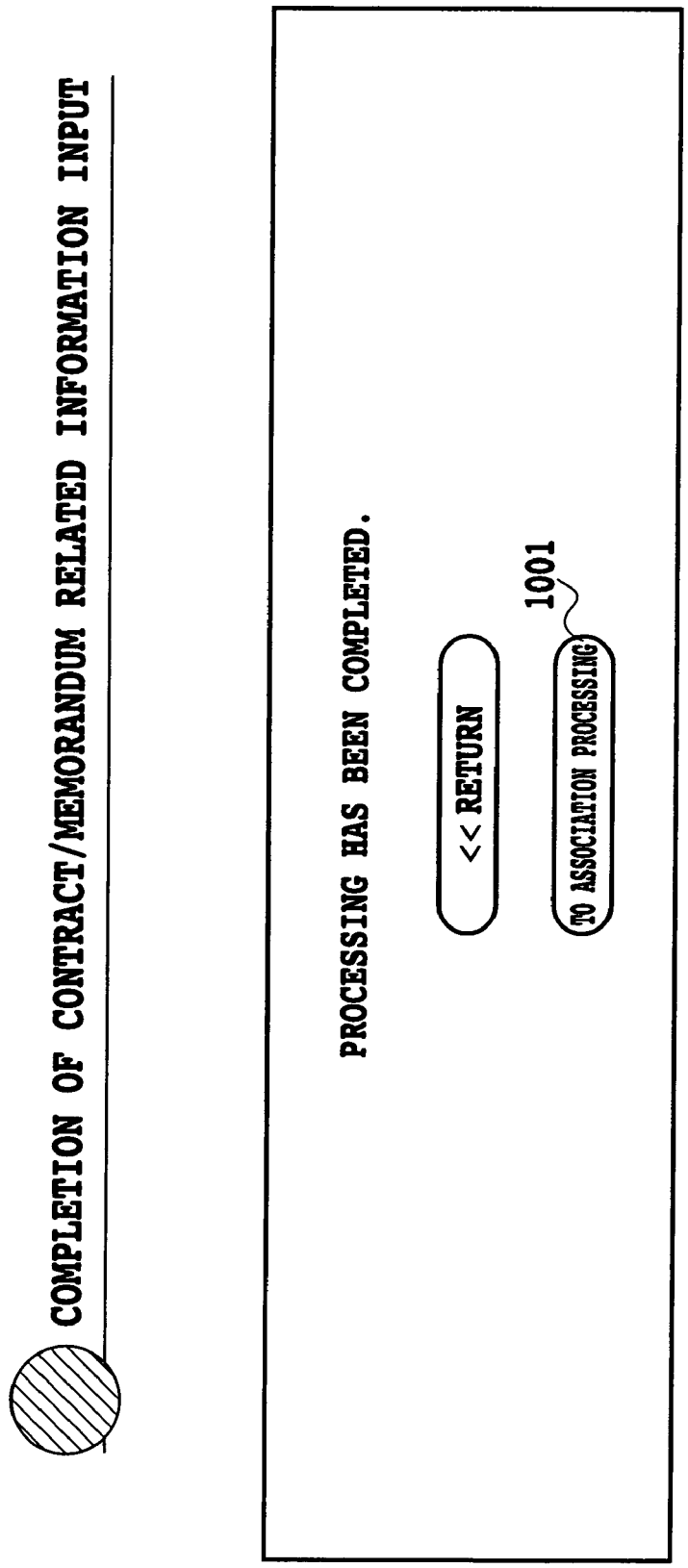
FIG. 10 is a diagram showing an example of a registration end screen in the embodiment.

Next, in step S322, the CPU 201 analyzes whether the user has depressed an association button 1001 in FIG. 10 according to reception information from the browser and determines presence or absence of an association instruction. Here, when the association instruction is inputted (Yes in S322), in steps S323 and S324, the CPU 201 transmits a display instruction to the PC 130 to cause the user to input retrieval conditions for a data file of an association destination as in steps S310 and S311. Since this operation is substantially the same as the contents described above, an explanation of the operation is omitted.

Figure 3B:
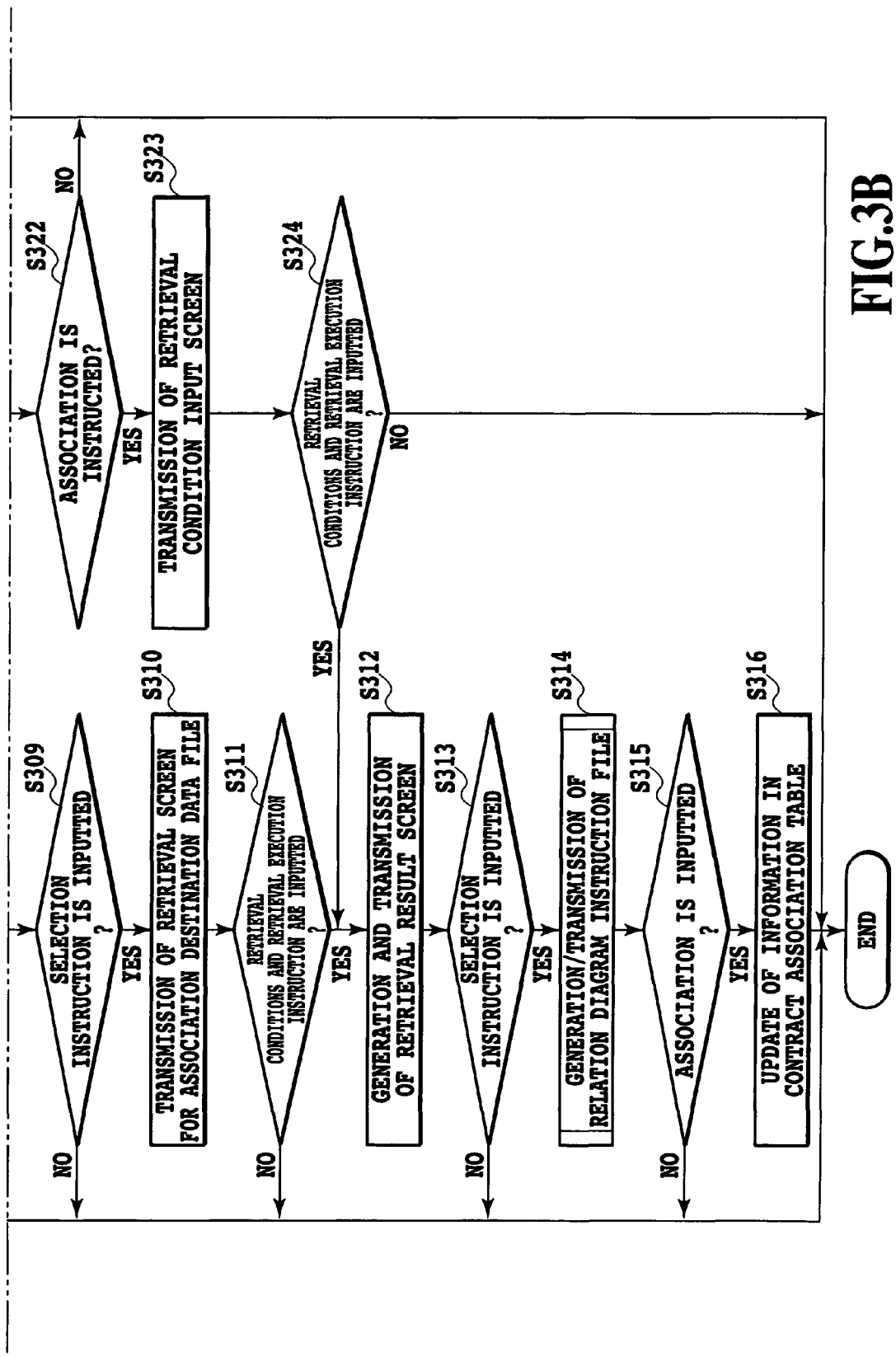

The various information tables concerning the data files registered and updated in the processing flow shown in FIG. 3 are temporarily generated in the RAM 203 and, then, stored in the nonvolatile external memory 111. The relation diagram shown in FIG. 13 is only an example, and various relation diagrams are possible as long as the relation diagrams are in forms for attaining the objects of the invention.

(Generation of a Group of Associated Data Files)

Next, concerning step S314 in FIG. 3, first, generation of a group of associated data files will be explained and, then, generation and transmission processing for a relation diagram display file will be described in detail with reference to the processing flow in FIG. 4.

First, in step S401, the CPU 201 sets the CONTRACT/MEMORANDUM document data file selected in step S313 in a temporary saving area in the RAM 203 as a retrieval object. Next, in step S402, the CPU 201 determines whether there is a parent contract for the retrieval object data file with reference to the contract association table 504 in FIG. 5. Here, if a parent data file (one hierarchy above the retrieval object data file) is present (Yes in S402), the CPU 201 changes the retrieval object to the parent data file (step S403) and repeats the processing.

If there is no parent contract in step S402 (No in S402), the CPU 201 shifts to step S404. Here, the absence of a parent contract means that the parent contract SEQ number in the contract association table 504 is NULL. In other words, the data file is a master contract or the like, which is a data file to be a center of the data file group, in a top hierarchy, that is, a root.

In step S404, the CPU 201 stores the present retrieval object data file as display data. In other words, the CPU 201 has searched the top data file as display data. At this point, a flag indicating retrieval is finished is set. Next, in step S405, the CPU 201 retrieves a contract SEQ number, in a parent contract SEQ number of which the retrieval object data file is set, from the contract association table 504. Here, if the contract SEQ number is present (Yes in S405), the CPU 201 stores contract SEQ numbers of all the detected data files as display data (step S406). An example of display data is shown in FIG. 15. The display data is temporary data generated on the RAM 203. The "flag indicating retrieval is finished" indicates that the determination in step S405 is finished with the data file as a retrieval object. Here, a flag "1" means an end, and when all flags are "1", this means that a data file group is generated completely.

Here, the CPU 201 determines whether the determination in S405 for all display data is finished from the retrieval flag in the display data in FIG. 15 (step S407). If an object not retrieved yet (with a flag "0") still remains, the CPU 201 sets a flag (step S408) and performs the determination in S405.

(Generation of a Relation Diagram Display File)

If all the display data have been retrieved in step S407 (Yes in S407), the CPU 201 generates display relation codes from information of a display file table shown in FIG. 15 (step S409).

FIG. 16 is a diagram showing a relation between display data files having predetermined contract SEQ number and display relation codes. In this embodiment, as shown in FIG. 16, the display relation codes are constituted by character strings. A display relation code with only "1" means a parent contract and is information for displaying a reduced image in which a front page of the parent contract is stored as a JPEG file. A display relation code "1-1" has the contract with "1" as a parent and means display data of a contract that should be displayed immediately behind the parent contract. A display relation code "1-1-1" has the contract with "1-1" as a parent and is displayed immediately behind the parent contract. The number of characters of the character string (in the case of "1-1", three characters including the hyphen) means a column in a template explained in FIG. 6 to be described later. By generating the display relation codes, since arithmetic processing for checking a parent-child relation of data files in every processing can be omitted even when a relation diagram indicating a tree structure of the data files is generated, it is possible to improve overall processing speed. In particular, this is effective when the number of files increases.

As shown in FIG. 6, in order to arrange JPEG files of contracts and associated component indications alternately to generate an HTML data file for display, that is, a two-dimensional display pattern, display data of the contracts are arranged in columns of odd numbers. Although both "1-1-1" and "1-1-2" are displayed in an identical column with "1-1" as a parent, "1-1-1" and "1-1-2" are different in that "1-1-2" is displayed in a position one row below "1-1-1".

For example, the two-dimensional display pattern is constituted by a two-dimensional array using a table tag of HTML. The JPEG files of contracts and the associated component indications are arranged for each cell of a table. In this case, in a cell in which neither a JPEG file nor associated component indications is required to be arranged, a rectangular image of the same size as a cell, which has the same color as a background color and does not have a frame line, only has to be prepared and arranged in advance. Since the number of repetitions of <TR> of the table tag and the number pieces of <TD> with respect to one piece of <TR> are determined from the number of contract data to be displayed and a relation among the contract data, it is possible to generate a two-dimensional display pattern dynamically.

Figure 17:
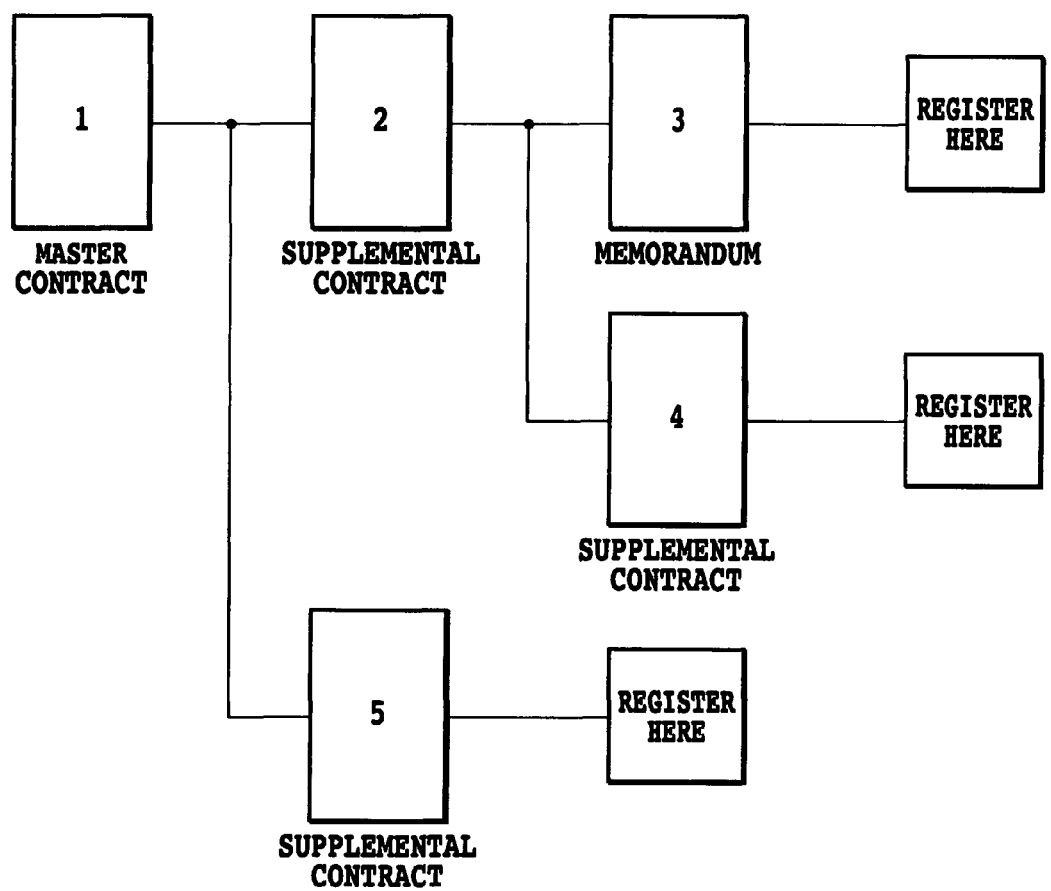
FIG. 17 is a diagram showing an example of display data of a relation diagram in the embodiment.

What is displayed finally using a correspondence table shown in FIG. 16 is a diagram of an image shown in FIG. 17. As an arrangement rule for respective contract files, when there is a file in a position "1-1-2" indicated by 4 in FIG. 17, a file of "1-2" is displayed in a lower row rather than the same row as 4. However, when "1-1-3" is present, the file is displayed in a row immediately below the lower row. In this way, a row in which "1-2" is displayed differs according to whether there are other files to be displayed in smaller rows.

Figure 4:
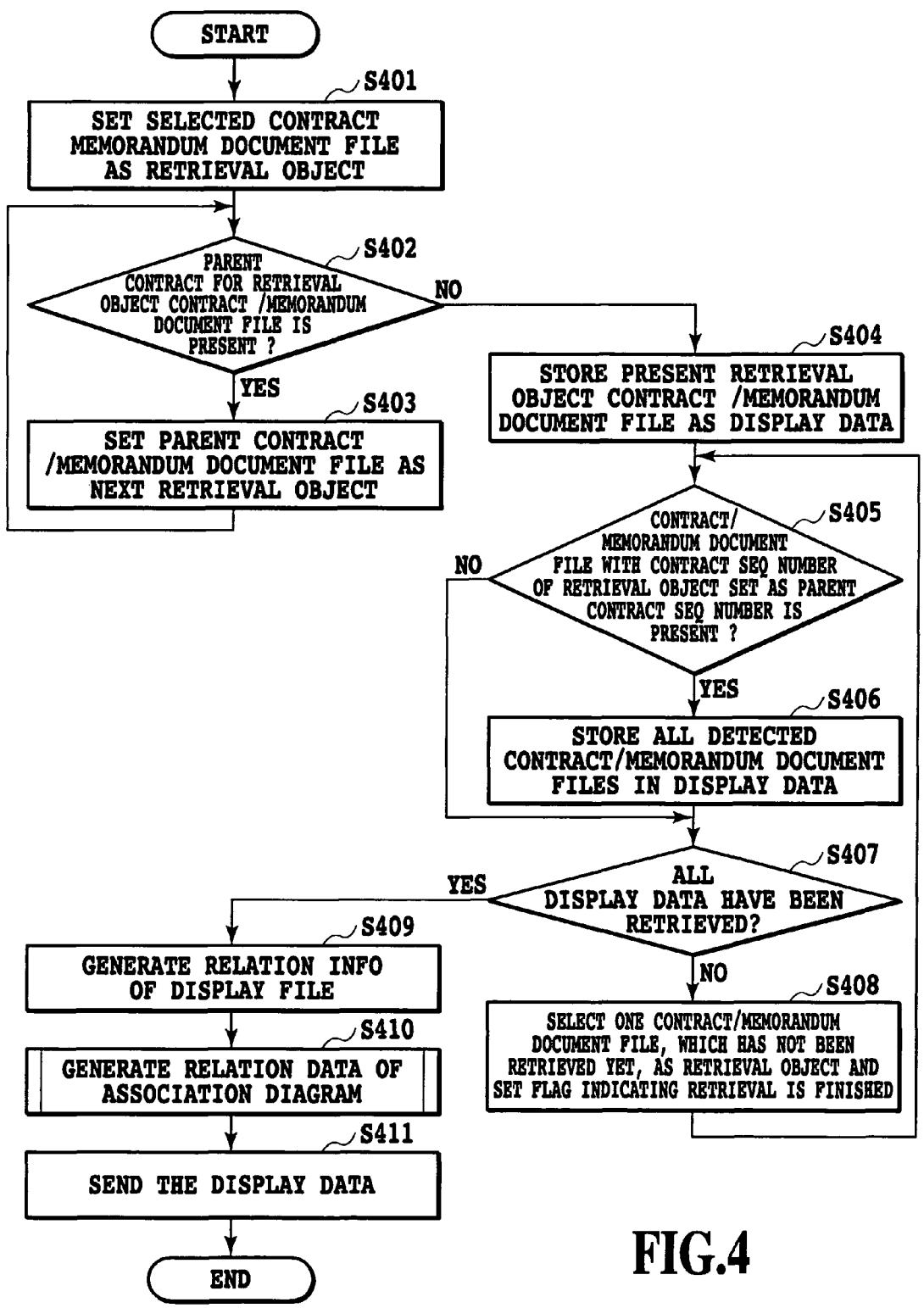
FIG. 4 is a diagram showing a flowchart for explaining the embodiment of the invention.

Returning to the explanation of FIG. 4, in step S410, the CPU 201 generates display data of a relation diagram shown in FIG. 17 from the template and the associated component indications shown in FIG. 6 using the display relation codes shown in FIG. 16. Then, the CPU 201 transmits relation diagram display data to a PC terminal of the user and ends the processing (step S411).

Figure 19B:
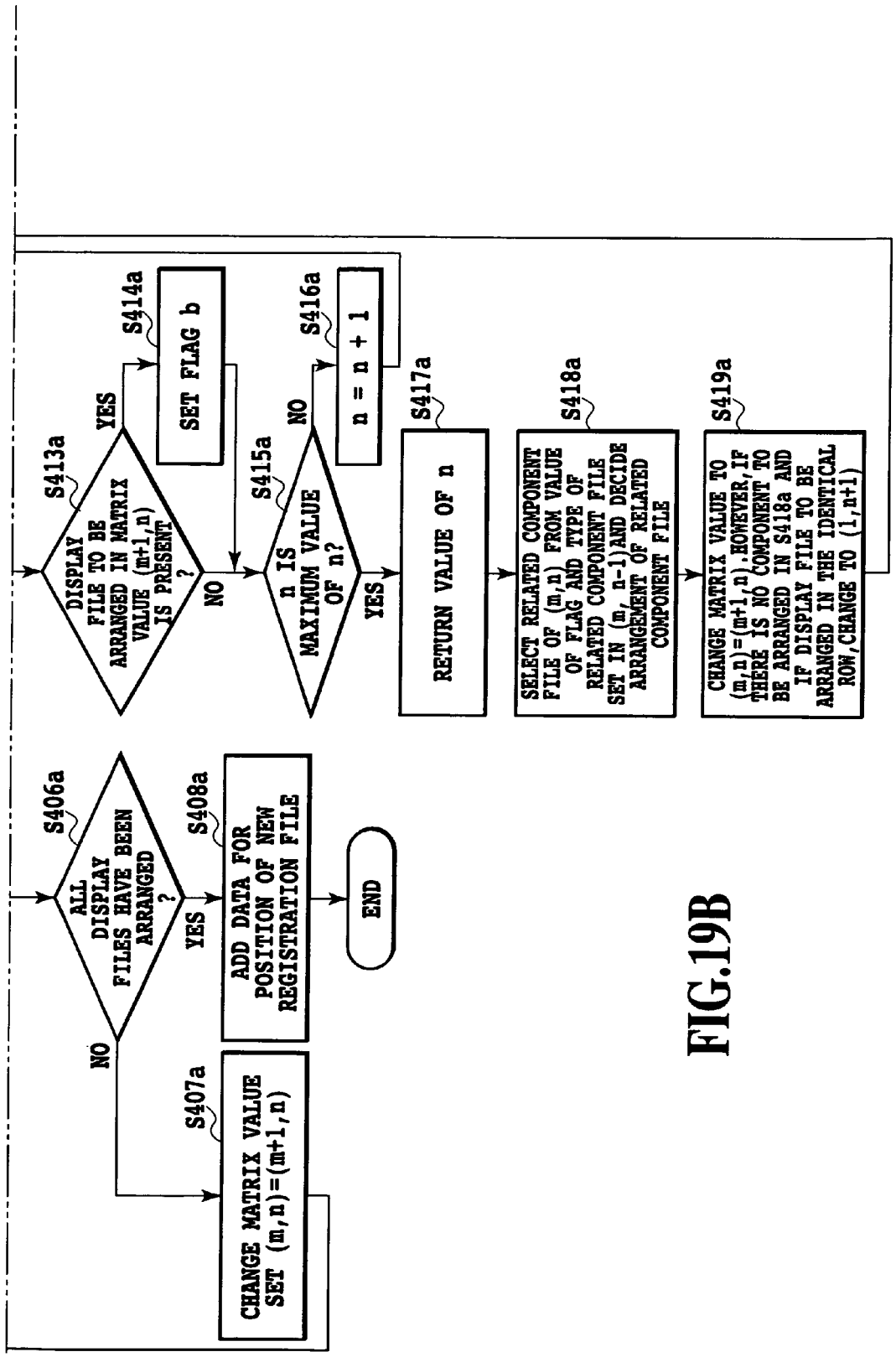

FIG. 19 is a diagram showing a detailed processing flowchart of step S410 in FIG. 4. In step S401a in FIG. 19, a matrix value (m, n) is used in order to determine arrangement positions of the template in FIG. 6. Here, it is assumed that the template in FIG. 6 are a template for repeatedly displaying the contract display data and the associated component indications alternately in the column direction and change in the column and row directions according to a tree structure to be displayed. The template in FIG. 6 is only an example, and any template may be used as long as the template defines positions where display files are arranged and positions of associated component indications with a matrix, coordinates, or the like. In the template in FIG. 6 explained in this embodiment, rows and columns are shown as limited for explanation. However, as it is evident in a flowchart to be explained below, it is possible to change the rows and the columns according to the number of display files and a relation among display files. However, it is needless to mention that, even if rows and columns are set as limited in advance in a template, it is possible to arrange display files if the number of the display files is small and the template falls under the scope of the invention.

First, in step S401a, the CPU 201 sets an initial value (1, 1) in a matrix value (m, n). In step S402a, the CPU 201 determines whether a column of the present matrix value (m, n) is an odd number. If the present matrix value (m, n) is an odd number, the CPU 201 shifts to step S403a. If the present matrix value (m, n) is an even number, the CPU 201 shifts to step S408a. In the template shown in FIG. 6, the column of the matrix value (m, n) is an odd number, which means that an arrangement of display data of contracts has to be decided. If the column of the matrix value (m, n) is an even number, this means that an arrangement has to be decided in order to display associated component indications.

In step S403a, the CPU 201 determines from the display relation codes shown in FIG. 16 whether there is a file to be displayed in the matrix value (m, n). For example, when the matrix value (m, n) is (1, 1), an arrangement of display data of a contract with the display relation code "1" is decided. In addition, when the matrix value (m, n) is (3, 1), since a value of the column is 3, the number of characters is three. Therefore, since the display relation code 9s "X-X" (as the number of characters of the display relation code, "-" is also counted as one character) and all the numerals are 1, "1-1" is selected as the display relation code. What is displayed in the matrix value (3, 1) is display data of a contract that has "1" as a parent and should be displayed in the identical row. In addition, no file is arranged in a location where there are two or more rows for one column. When a last character in a character string of a display relation code " . . . -X-X-X" is different from that in another display relation code in the same position (number of characters), this means that display data is displayed in another row.

While a character string of "-1" continues in display relation codes, display data is displayed in an identical row. When the character string changes, display data is displayed in another row. For example, when display data are "1-1-1" (the number of characters is five) and "1-1-2" (the number of characters is five), these two should be displayed in immediately adjacent rows. A contract display file of display data of "1-2" is arranged in a row lower than "1-1-2". Moreover, a display position of "1-2" is naturally displayed in different rows when a display relation code of "1-1-3" is present and when the display relation code is not present. In the former case, the display position is one row below the display position in the latter case.

In step S404a, the CPU 201 decides an arrangement of the display file retrieved in step S403a in the matrix value (m, n). In step S405a, the CPU 201 decides that there is no display file. Next, in step S406a, the CPU 201 determines whether arrangements of all the display files in FIG. 16 are decided. When the arrangements of all the display files are decided in step S406a, next, in step S408a, the CPU 201 decides and arranges a position of an associated component indication 608 shown in FIG. 6 in accordance with a predetermined rule. The associated component display 608 is used when another data file is associated anew. In other words, when a relation diagram display file of this embodiment is generated and displayed on the browser of the personal computer of the user, the user can designate a data file, which the user intends to associate, and select a position where the data file is associated from the relation diagram. In that case, a position where the association is possible in the relation diagram is represented by this associated component indication 608. Consequently, the user can set new association of the data file simply by clicking the desired associated component indication 608.

As a rule for such an associated component indication arrangement, for example, taking into account a simplest rule, when it is assumed that a matrix value of a file with a largest column in an identical row is (m1, n1), the associated component indication 608 is set behind the matrix value (m1, n1). In other words, in order to generate display data shown in FIG. 17, the CPU 201 decides an arrangement of an associated component indication 602 in (m1+1, n1) and decides an arrangement of the associated component indication 608 in (m1+2, n1) and adds the associated component indication 608 to thereby generate a final display image data file to end the processing.

In addition, when it is determined in step S406a that all the display files have not been arranged, in step S407a, the CPU 201 increases one column in order to change the matrix value (m, n) and returns to step S402a. On the other hand, when a column is an even number in step S402a, the CPU 201 shifts to step S409a in order to arrange an associated component indication and stores a value of a row. In addition, in step S410a, the CPU 201 calculates a maximum value of the row. Under a matrix value determination rule for display, when " . . . -1" continues in the display relation code character string in FIG. 16, display files are displayed in an identical row once and, when a numerical value of a character string of an identical column increases by one as in " . . . -2" and " . . . -3", the display is determined in a matrix value with a row increased. Thus, all change points only have to be seen. For example, when FIG. 16 is used, display files are finally displayed as shown in FIG. 17. However, as it is seen from the display relation codes in FIG. 16, since the numerical value changes twice starting from n=1, a maximum value of the row is 3.

Next, in step S411a, the CPU 201 determines from the display relation codes in FIG. 16 whether there is a file to be arranged in a matrix value (m−1, n). Since a method for this determination is the same as step S403a, an explanation of the method is omitted. If there is a display file in step S409a, the CPU 201 sets a flag "a" to the matrix value (m−1, n) (step S412a). If there is no display file to be arranged, the CPU 201 directly shifts to step S413a.

In step S413a, the CPU 201 determines from the display relation codes in FIG. 16 whether there is a file to be arranged in a matrix value (m+1, n). Since a method of this determination is the same as step S403a, an explanation of the method is omitted. If there is a display file to be arranged in step S413a, the CPU 201 sets a flag "b" to the matrix value (m+1, n) (step S414a). If there is no display file to be arranged, the CPU 201 directly shifts to step S415a. Thereafter, in step S415a, the CPU 201 determines whether the retrieval has ended up to the maximum value of the row calculated in step S410a. If the retrieval has not ended yet, the CPU 201 increases one row in step S416a and returns to step S402a.

If the retrieval has ended up to the maximum value of the row in step S415a, in step S417a, the CPU 201 returns to the row stored in step S409a. Moreover, in step S418a, the CPU 201 selects an associated component indication of a matrix value (m, n). For example, if first two flags are "a" and "b" when flags are arranged, the CPU 201 selects an associated component indication including a [full width crossbar]. In addition, if the flags are only "a", the CPU 201 selects an associated component indication of a file including a [left half crossbar] for a cross bar. Then, when "a" or "b" is present other than the first two flags, the CPU 201 selects a display component indication including a [lower half bar]. When an associated component indication of (m, n−1), which has already been determined, includes the [lower half bar] as in 601, 603, 604, and 605, the CPU 201 selects an associated component indication including an upper half bar. When there is no associated component indication to be arranged, the CPU 201 does not create data of (m, n) itself. Under such conditions, the CPU 201 selects associated component indications and temporarily stores the associated component indications in the RAM 203 together with the matrix value (m, n). Then, in step S419a, the CPU 201 changes the matrix value (m, n) to (m+1, n). However, if there is no component to be arranged in S418a and if there is no display file to be arranged in the identical row, the CPU 201 changes the matrix value (m, n) to (1, n+1).

Note that, if a result of the determination in step S406a is "Yes" and if the display as shown in FIG. 17 is performed, a relation between display matrix values and display files in a state before the execution of step S408a is determined as shown in FIG. 18.

As explained above, according to this embodiment, it is possible to visually represent a relation among data files. Thus, for example, it is easy to understand information of which data file should be referred to concerning a certain data file. In addition, it is possible to display sections where data files can be registered when the data files are associated. Thus, there is an advantage that, even when a data file is associated with a large number of data files, which have already been associated with one another, anew, it is clear and easy to understand in which position the new association is registered and in which position the new association should be registered.

Next, step S316 in FIG. 3, which is executed by the CPU 201 of the management server 110, will be explained in detail with reference to FIGS. 20 to 24. More specifically, this is processing for restructuring a tree structure by adding a data file to an existing tree structure constituted by plural data files. In the invention, in order to allow a user to easily add a data file to tree display anew, a position where the data file can be added is explicitly shown using an indication like "register here" in FIGS. 13 and 17 and the user selects an image indicating this position for the addition with an input unit (e.g., a pointing device such as a mouse) of the PC 130. This makes it possible to indicate a position where the data file is added to the tree structure.

Here, the management server 110 adds the specific data file determined in step S309 or step S318 in FIG. 3 to the tree structure including the data file determined in step S313 in FIG. 3.

Figure 20:
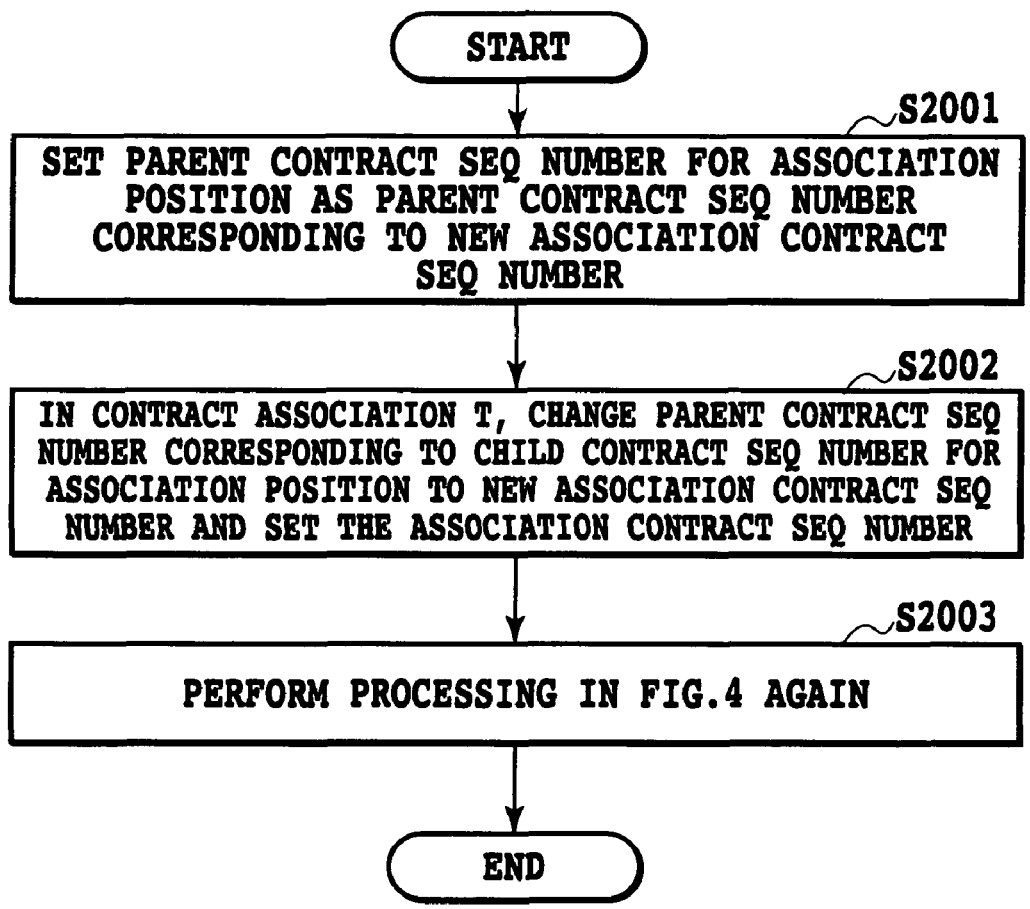
FIG. 20 is a diagram showing a flowchart for explaining an embodiment of the invention.

FIG. 20 shows information update processing for the contract association table 504 as described above. The CPU 201 of the management server 110 determines reception of information on a position of addition that is transmitted in response to depression of the associated component indication 608, which indicates a position where a data file can be added, in the PC 130 on the user side in step S315. As the information on a position of addition, it is possible that a coordinate position or the like specifying the associated component indication 608 is included. Data files adjacent to the data file to be added (data files in an upper layer and a lower layer) only have to be specified. If a result of determination in step S315 is Yes, step S316 is executed and the processing in FIG. 20 is performed.

Figure 21:
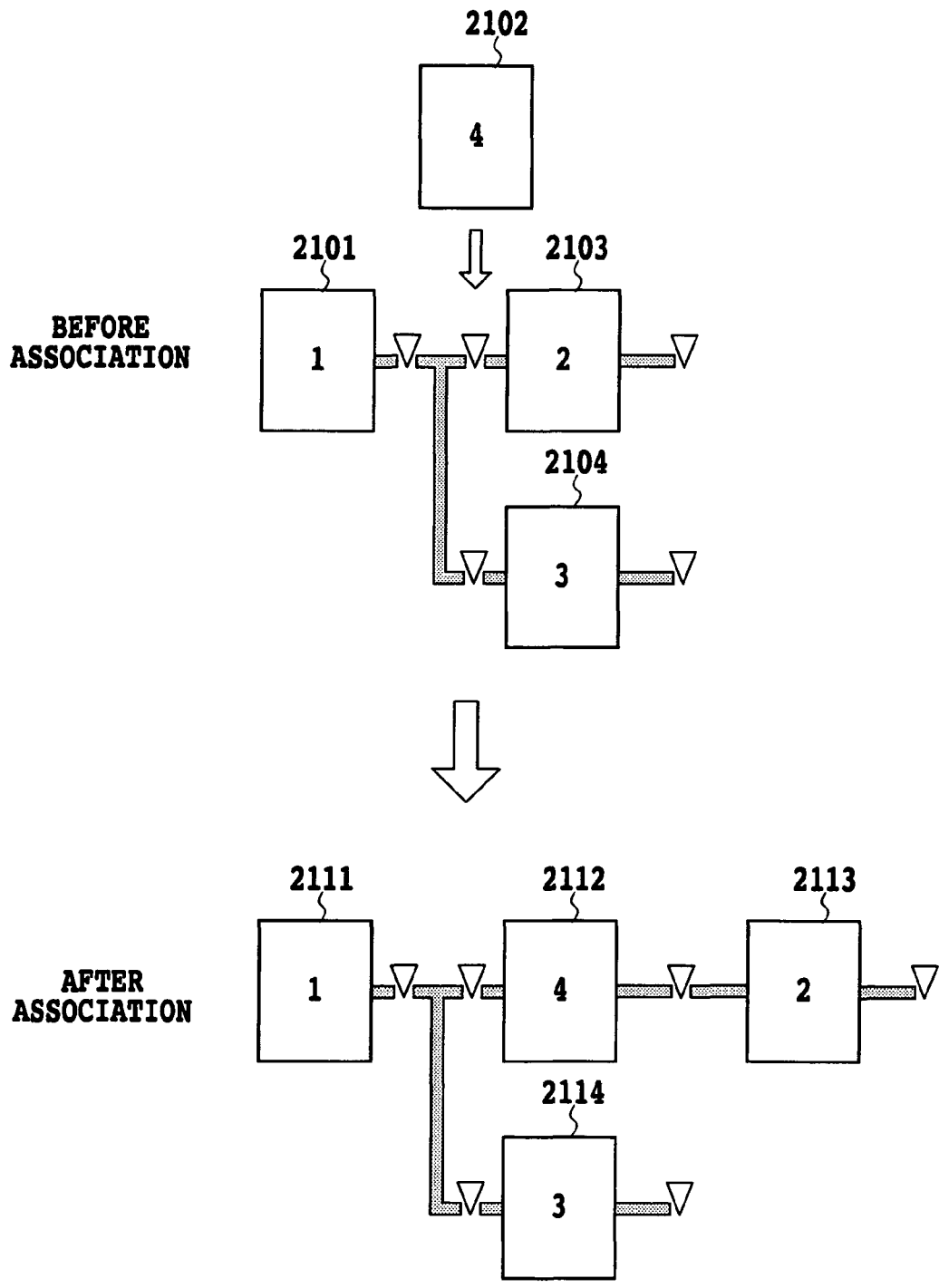
FIG. 21 is a diagram representing an example of association of data files in the embodiment.

First, the processing will be explained with a case in which a data file with a contract SEQ number "4" registered anew is associated with an existing tree structure of data files with contract SEQ numbers "1, 2, and 3" as shown in FIG. 21 as an example.

In step S2001, the CPU 201 sets a parent contract SEQ number for a position of association designated by the user to a parent contract SEQ number in the contract association table 504 of the data file to be associated anew. Here, the CPU 201 sets "1" to the parent contract SEQ number "4". In addition, in step S2002, the CPU 201 changes a parent contract SEQ number in the contract association table 504 of a child contract SEQ number associated with the position of association designated by the user to the contract SEQ number of the data file to be associated anew. In the case of FIG. 21, the parent contract SEQ number is changed from "1" to "4".

In short, the contract association table 504 before change in FIG. 21 is as shown in FIG. 22. When an association position is designated in a position of an arrow as shown in FIG. 21, the contract association table 504 is updated as shown in FIG. 23. In step S2003, the CPU 201 repeats the processing in FIG. 4 using this contract association table 504. Thus, it is possible to generate a relation diagram display data of data files having a new tree structure and send the relation diagram display data to the PC 130 of the user and the tree structure is redrawn on the PC 130. Consequently, when association of the data files is performed, the management server 110 performs redrawing of data tree display with the new association as a trigger. The generation of display file related information (a display file table, a display file related data table) in step S409 at the time of this redrawing is performed on the basis of the contract SEQ number "4" that is selected as an object to be associated anew.

With the processing described above, when a data file is associated with tree display of data files anew, the user designates an association position of a new contract data file. In response to the designation, the management server 110 performs restructure of a tree structure, generates display data, and transmits the display data, whereby the tree structure is redrawn on the PC 130.

Figure 24A:
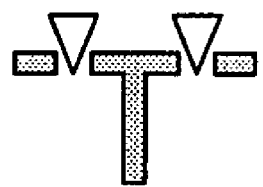
FIG. 24A, FIG. 24B, and FIG. 24C are diagrams showing other examples of an associated component diagram.
Figure 24B:
Figure 24C:

As another modification, it is also possible to have the respective related component files shown in FIG. 6 as plural image data. For example, it is possible to use image data consisting of five parts as shown in FIG. 24a, image data consisting of three parts as shown in FIG. 24b, and image data consisting of two parts as shown in FIG. 24c. Here, in particular, a triangle mark explicitly shows a position where a data file can be added.

For example, when it is determined in step S418a in FIG. 19 that a related component file of a "T" shape is selected from a relation among display files, the CPU 201 only has to control a position such that the five parts are arranged in the matrix value (m, n). In other words, the CPU 201 performs control to break down and arrange the matrix value (m, n) according to sizes of the five parts registered in advance. By determining correspondence between data association rules and related component files in advance, for example, in the case of the relation of a "T" shape, it is possible to associate a data file to two sections shown in the figure. In the case of an L shape or a simple cross bar, it is possible to associate a data file only to one section.

When the user designates a position of the triangle mark on the browser, the management server 110 acquires designated coordinates as CGI parameters or the like from the general-purpose browser of the PC 130 on the user side. Then, from this information, the CPU 201 of the management server 110 is capable of detecting with which parent data a data file is associated. The CPU 201 only has to restructure the contract association table 504 according to the association.

For example, by attaching hyperlink to the triangle mark when the triangle mark is arranged, it is possible to transmit position information when the position of the triangle mark is designated.

Next, an embodiment shown in FIGS. 25 to 29 will be explained with reference to the figures. In the embodiment explained in FIG. 13, 17, or 21, there is one relation diagram of data files (display of a tree structure of data files). In this embodiment, a case in which relation diagram display data having plural tree structures is generated will be explained.

Figure 25:
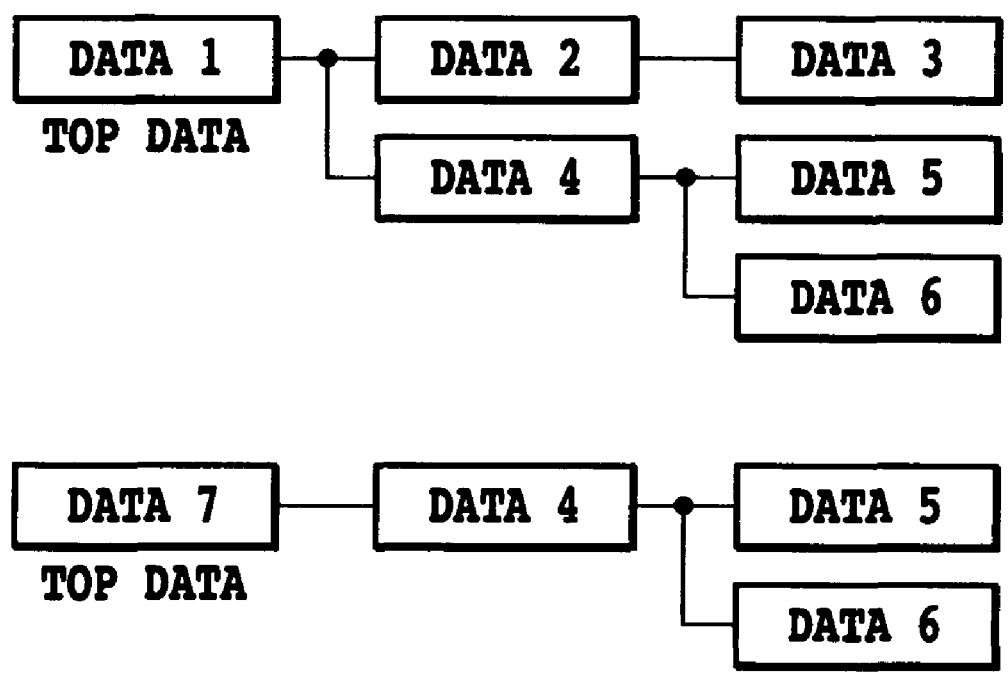
FIG. 25 is a diagram showing another embodiment of display data in the invention.

For example, this is a case shown in FIG. 25 in which a relation diagram file having plural tree structures is generated as a relation diagram. FIG. 25 is a screen for retrieving an association destination of FIG. 11. When a data file equivalent to the contract SEQ number "4" is selected from a list of data files in FIG. 12 indicating a result of retrieval by the user, the screen is transmitted to the PC 130 and displayed on a display unit 260. FIG. 25 is only an example and three or more tree structures may be created. This embodiment will be hereinafter explained in detail.

In the explanation with reference to FIG. 5, the contract association table 504 has one parent contract SEQ number for a contract SEQ number. In the embodiment shown in FIG. 25, the contract association table 504 in which plural parent contract SEQ numbers are associated with an identical contract SEQ number is created. For example, the contract association table 504, which is a basis of relation diagram display data consisting of two tree structures in FIG. 25, is as shown in FIG. 26.

In FIG. 26, the contract association table 504 has "1" and "7" as parent contract SEQ number for a contract SEQ number "4". These are data files in which a parent contract SEQ number for the own contract SEQ numbers "1" and "7" is "NULL". The data files become top hierarchies of the tree structures and are displayed as centers of the tree structures. Therefore, when a file with the contract SEQ number "4" is selected from the list shown in FIG. 12, relation diagram display data is created as plural tree structures. When relation diagram display data consists of three or more tree structures, another parent contract SEQ number is tied to the relation diagram display data.

Figure 27B:
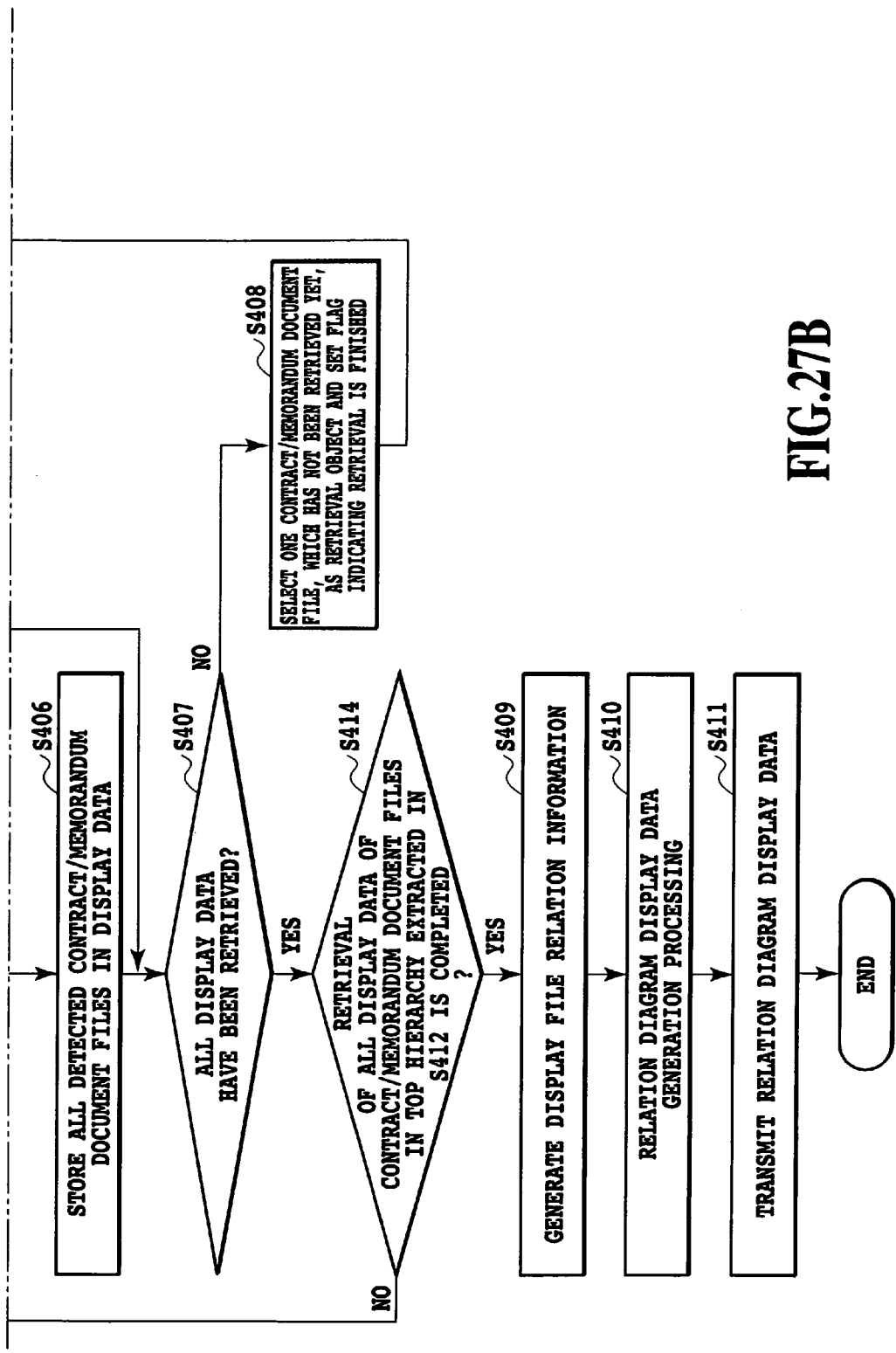

Here, differences from FIG. 4 explained in the embodiment shown in FIG. 13, 17, or 21 will be explained with reference to FIG. 27. In step S412, the CPU 201 checks a parent contract SEQ number for a selected contract/memorandum document file and retrieves and extracts all CONTRACT/MEMORANDUM document files (data files) located in top hierarchies (a parent contract SEQ number is NULL in the contract association table 504 in FIG. 5). This data is temporarily stored in the RAM 252. Next, in step S413, the CPU 201 selects one CONTRACT/MEMORANDUM document file, for which display generation has not been generated, among the CONTRACT/MEMORANDUM document files to be top hierarchies extracted in step S412 and sets the CONTRACT/MEMORANDUM document file as a display data retrieval object for display data generation processing. Thereafter, as explained in FIG. 4, the CPU 201 performs processing from step S404 to step S408. When retrieval of all display data is finished in step S407, in step S414, the CPU 201 checks whether retrieval of all display data in the CONTRACT/MEMORANDUM document files in the top hierarchies extracted in step S412 is finished and, if the retrieval is not finished, returns to step S413. If the retrieval of all display data in the CONTRACT/MEMORANDUM document files in the top hierarchies is finished in step S414, in step S409, the CPU 201 generates display file relation information. As explained in the first embodiment, the display file relation information is information for generating display relation codes and generates a display file relation data table shown in FIG. 16. Here, FIG. 28 is a display file table showing an example of display data. FIG. 29 shows a display file relation table that is created by generating display relation codes.

The embodiment shown in FIGS. 28 and 29 is different from the embodiment shown in FIG. 13, 17, or 21 in that number of display blocks are managed because relation indication files having plural tree structures are generated. The number of the relation indication files is equivalent to the number of the CONTRACT/MEMORANDUM document files in the top hierarchies.

Processing for generating a relation indication file using the display file relation table in FIG. 29 can be realized by repeating the processing shown in FIG. 19 by a unit of a display block number and shifting a display position in a Y direction (a row increasing direction) when a relation diagram display data is generated for each display block number. In this way, it is possible to generate display data having plural tree structures shown in FIG. 25.

Next, an embodiment shown in FIGS. 30 to 33 will be explained. Here, an example of a change to a tree structure of files of contract data, which has already been generated, will be explained. The change in this context means operation other than the operation for associating (tying) a data file to a tree structure of data files explained in the embodiments shown in FIGS. 13, 17, 21, and 25. For example, the change is release of association (tying) of data files present in a tree structure, which have already been associated, or deletion of the data files themselves.

Figure 30:
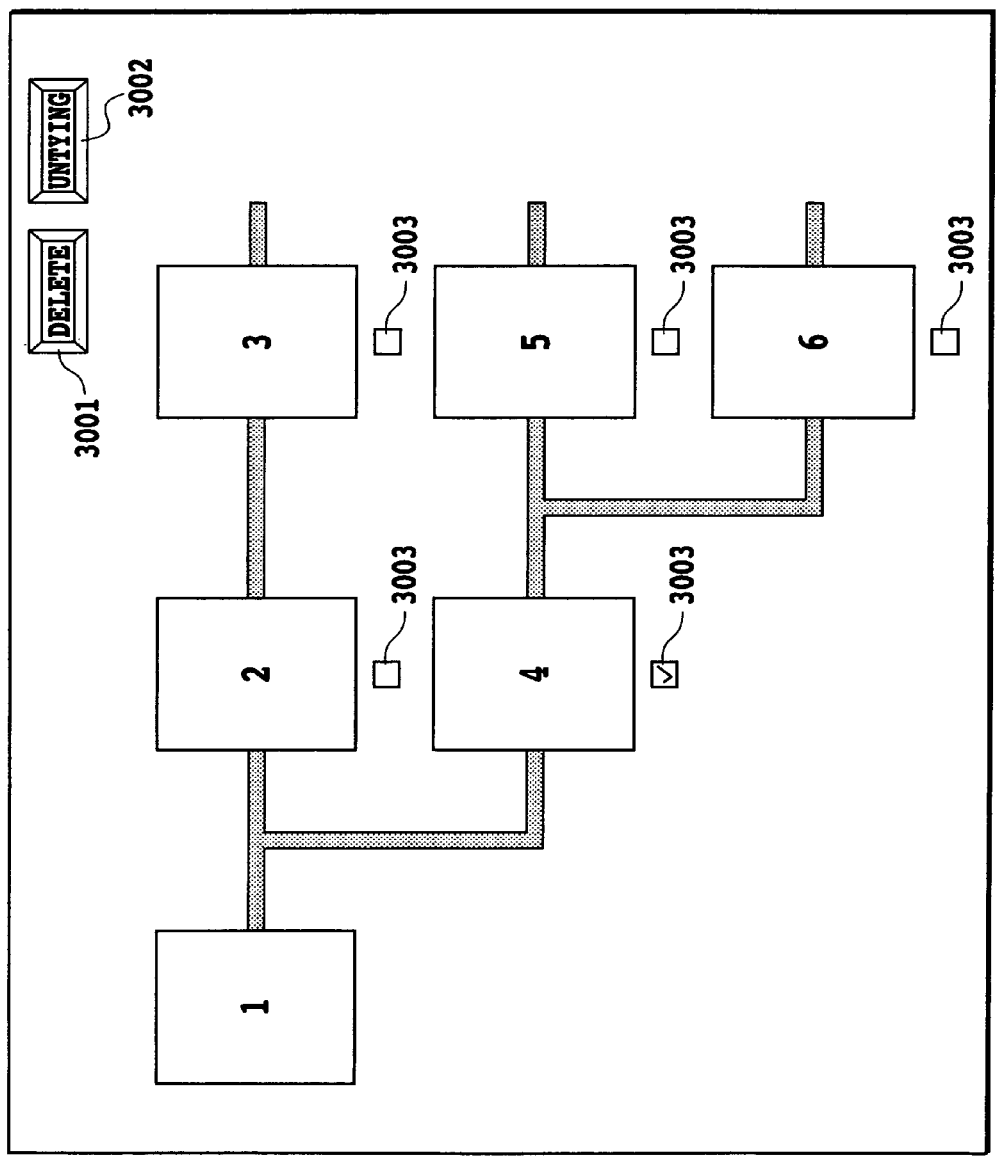
FIG. 30 is a diagram showing an example of a user interface having display data in the invention.

FIG. 30 is a file relation indication diagram of a tree structure that is displayed on the display unit 210 by the general-purpose browser of the PC 130 of the user. In this file relation indication diagram, as a modification of the main menu in FIG. 7, a not-shown contract association change button is provided other than the CONTRACT/MEMORANDUM document association button 702. The management server 130 detects that the contract association change button is depressed according to input from the input unit 209 on the PC 130 by the user, transmits a retrieval screen shown in FIG. 11, transmits a list of retrieval results shown in FIG. 12 to the PC 130 in response to information on the input, generates and transmits data for data tree display related to a data file of a contract selected by the user. The transmitted data are constituted by HTML data files generated by the management server 130.

FIG. 30 is display of a tree structure. Since operation for adding a data file is not performed when the tree structure is changed, the tree display is performed with an image in a relation indication section not including a triangle mark for association. Here, reference numeral 3001 denotes a deletion button for a data file of a contract. The deletion button 3001 deletes a data file with a check box 3003 checked from the tree. Reference numeral 3002 denotes an untying button for releasing association (tying) of data files of contracts. The untying button 3002 releases association of a data file with the check box 3003 checked with a high-order hierarchy.

Figure 31:
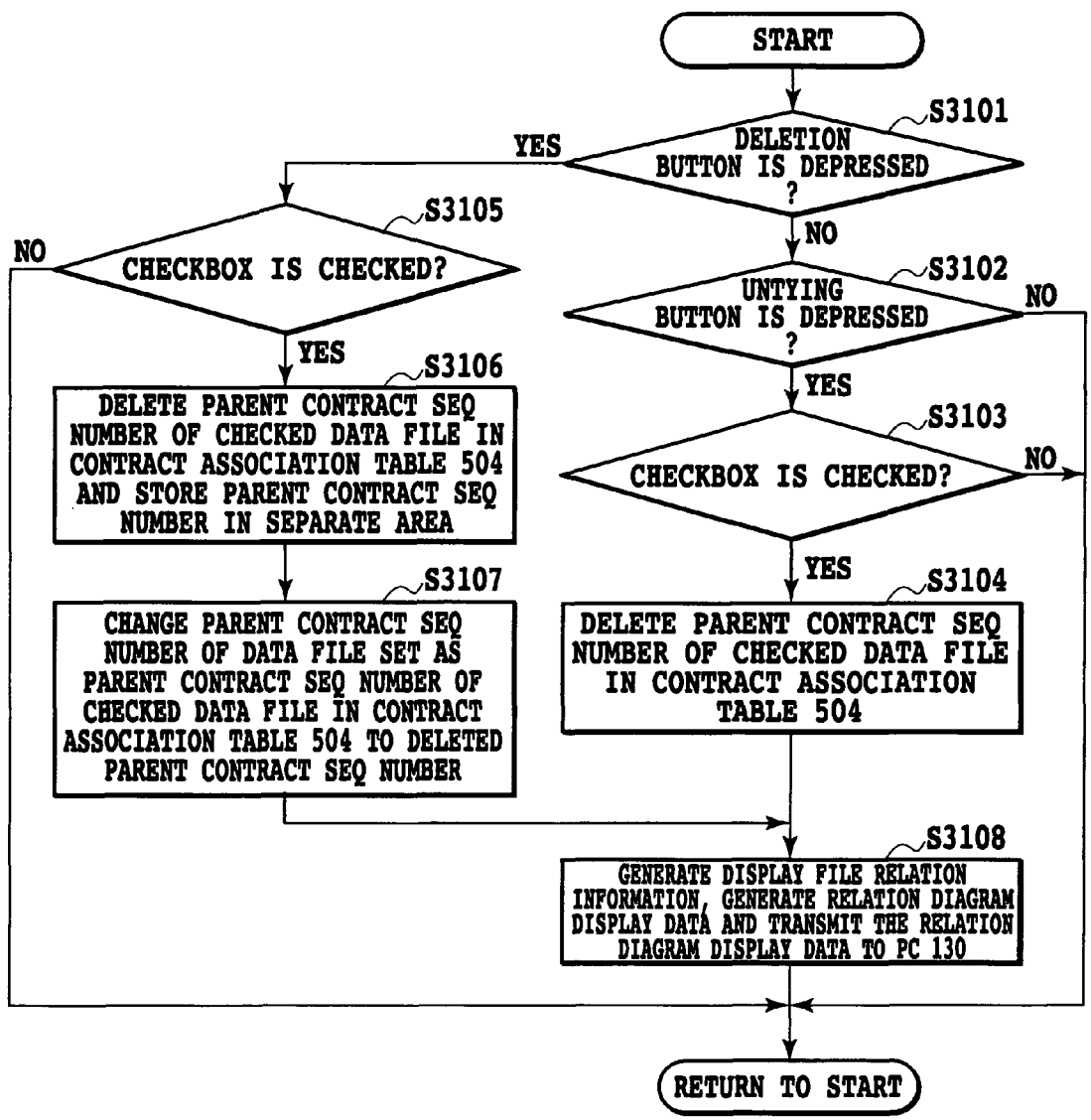
FIG. 31 is a diagram showing a flowchart for explaining an embodiment of the invention.

A case in which the deletion button 3001 and the untying button 3002 in FIG. 30 are depressed will be hereinafter explained with reference to a flowchart in FIG. 31. First, the user uses the input unit 209 of the PC 130 to check a check box of a data file of a contract, for which the user wishes to change association, before depressing the respective buttons for change. For example, in FIG. 30, the contract SEQ number "4" is designated. It is assumed that the flowchart in FIG. 31 is executed by the CPU 201 of the management server 110 in this state.

First, in step S3101, the CPU 201 determines whether the deletion button 3001 is depressed. If the deletion button 3001 is depressed, the CPU 201 shifts to step S3105. If the deletion button 3001 is not depressed, the CPU 201 shifts to step S3102 and determines whether the untying button 3002 is depressed.

In step S3102, the CPU 201 determines whether the untying button 3002 is depressed. If the untying button 3002 is depressed, in step S3103, the CPU 201 determines whether the check box 3003 is checked. Here, the CPU 201 detects which data file (or data files) of a contract is checked in the check box 3103 and temporarily stores the data file in the RAM 202. If no check box 3003 is checked, the CPU 201 determines that an error has occurred and returns to step S3101.

If it is confirmed in step S3103 that there is a data file checked in the check box 3003, the CPU 201 executes processing in step S3104, deletes a parent contract SEQ number in the contract association table 504 from the data file temporarily stored in the RAM 202 in step S3103 (insertion of data in a "NULL" state without a parent contract SEQ number), executes processing in step S3108, and performs data transmission for displaying the relation diagram display data again.

When the deletion button 3001 is depressed in step S3101, in step S3105, the CPU 201 determines whether the check box 3003 is checked. Since this processing is the same as the processing explained in step S3102, a detailed explanation of the processing is omitted. If any one of the check boxes is checked in step S3105, in step S3106, the CPU 201 deletes a parent contract SEQ number in the contract association table 504 from a data file with the checkbox (insertion of "NULL" data) and stores the parent contract SEQ number in the RAM 202. If no check box is checked in step S3105, the CPU 201 determines that an error has occurred and returns to the start.

In step S3107, the CPU 201 changes a parent contract SEQ number of a data file set as the parent contract SEQ number of the data file of a contract checked in the check box to the parent contract SEQ number stored in step S3105 on the contract association table 504. Then, in step S3018, the CPU 201 performs processing for redrawing the tree structure.

In step S3108, the CPU 201 performs processing for displaying a tree structure as in steps S409 and S410 in FIG. 4 and transmits data to the PC 130 on the user side to cause the user to redraw the tree structure.

Figure 32:
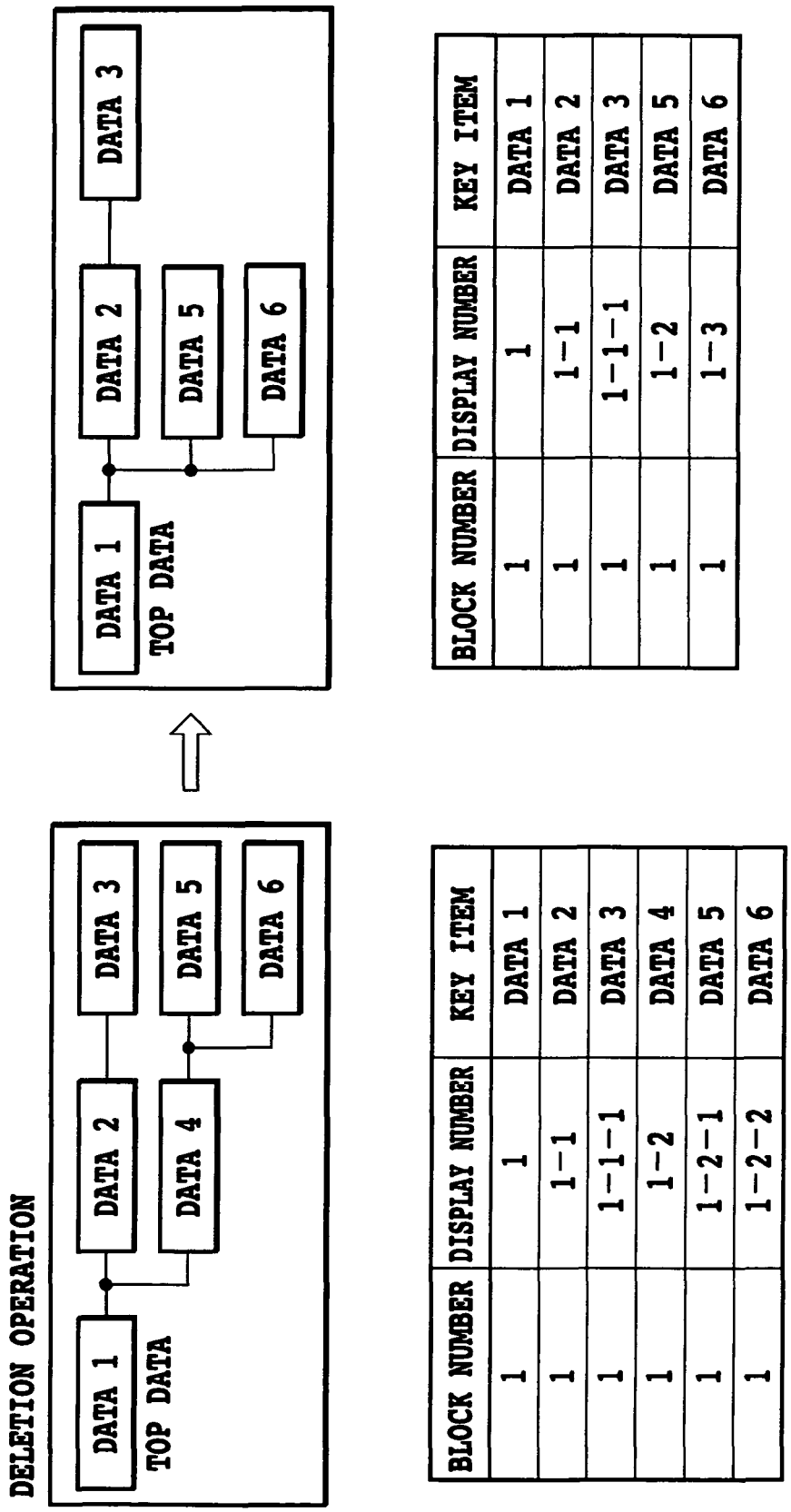
FIG. 32 is a diagram showing a deletion operation of the embodiment.

FIG. 32 illustrates change of a display screen in the case in which the deletion button 3001 is depressed, and change of a display file relation data table in that case. Display data is changed according to a change of the contract association data table 504.

Figure 33:
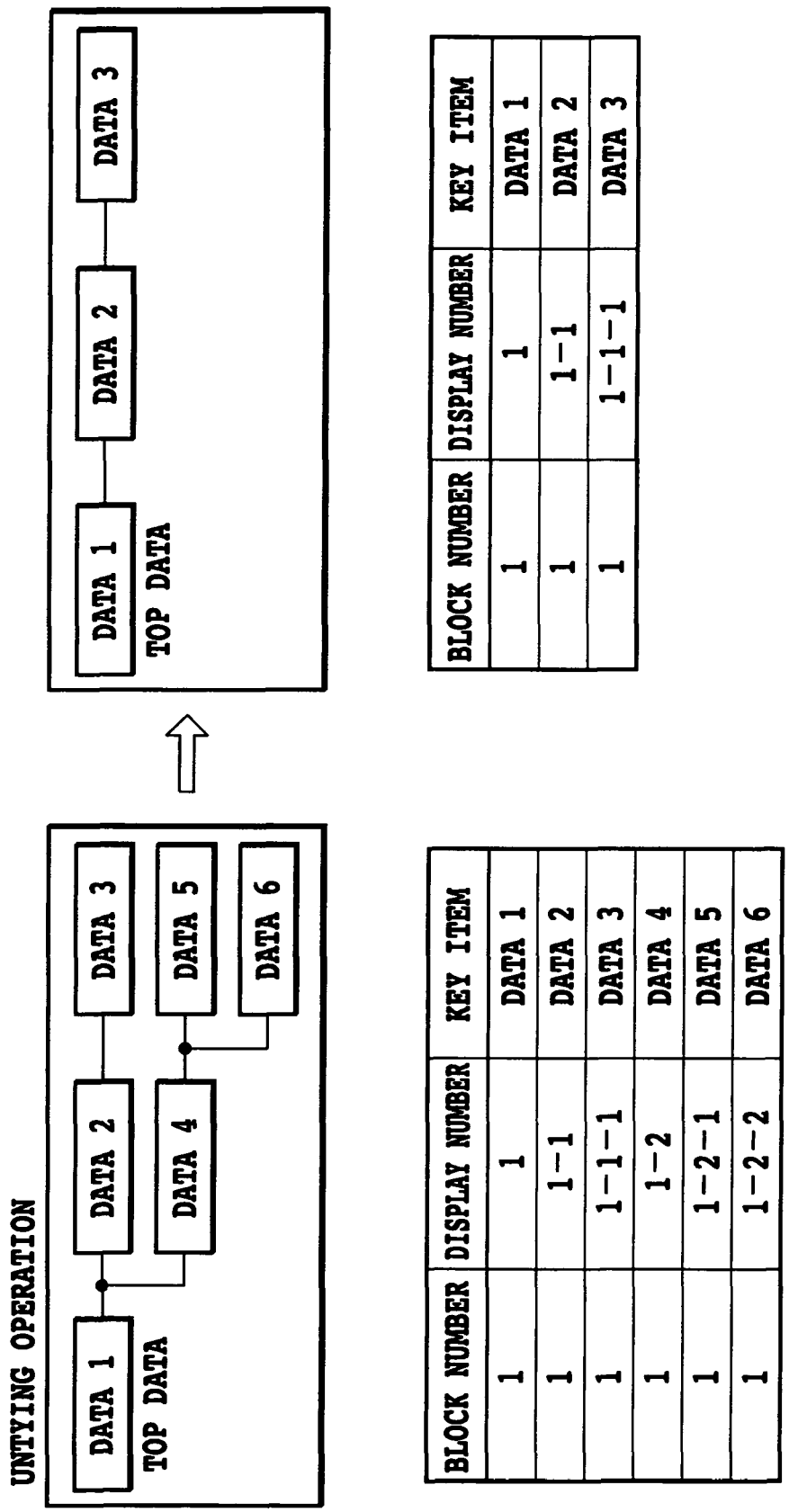
FIG. 33 is a diagram showing an untying operation of the embodiment.

Similarly, FIG. 33 illustrates change of a display screen in the case in which the untying button 3002 is depressed, and change of a display file relation data table in that case.

As described above, it is possible to change a tree structure of data files that has already been created.

As yet another modification, a cooperating system for load distribution in the management server 110 and the PC 130 is possible. For example, in the embodiments described above, creation of HTML data files, which are relation diagram display data, is performed solely in the management server. However, it is also possible to create a display file relation data table in the management server, transmit the image files of 601 to 608 in FIG. 6, which are used as thumbnails and associated component indications of contracts for tree display, and display file relation data tables shown in FIGS. 16, 24, 32, and 33 to the PC 130, the processing in FIG. 19 is executed on the general-purpose browser of the PC 130 using Java applet or the like, which is a known technique, to thereby generate HTML data files for display and distribute loads in the management server 110 and the PC 130. This is also within the scope of the invention.

The embodiments of the invention have been described. However, the invention can take a form of, for example, a system, an apparatus, a method, a program, or a storage medium. More specifically, the invention may be applied to a system constituted by plural apparatuses or may be applied to an apparatus consisting of one apparatus.

The present invention is not limited to the above embodiments and various changes and modifications can be made within the spirit and scope of the present invention. Therefore, to appraise the public of the scope of the present invention, the following claims are made.

This application claims priority from Japanese Patent Application Nos. 2003-423837 filed Dec. 19, 2003, 2004-357321 and 2004-357322 filed Dec. 9, 2004, which is hereby incorporated by reference herein.

What is claimed is:

1. An apparatus for managing data files comprising:
   a memory for storing plural data files and association information associating between the plural data files; and
   a two-dimensional display unit for generating a two-dimensional display pattern based on a template and the association information, wherein the two-dimensional display pattern indicates a relation diagram of the plurality of data files, and wherein the template includes tags which define a table that includes first display columns for arranging data file images corresponding to the data files and second display columns for arranging relation indication images corresponding to associations between the data files, wherein the template defines positions in the table using matrix values,
   wherein said two-dimensional display unit comprises:
   a data file arrangement determining unit for determining positions where the data file images corresponding to the respective data files are arranged in the first display columns of the table defined by the tags of the template, based on the association information and matrix values of the template;
   a relation indication determining unit for determining positions where the relation indication images corresponding to the associations between the data files are arranged in the second display columns of the table defined by the tags of the template, based on the association information and matrix values of the template; and
   a generator for generating the two-dimensional display pattern by arranging the data file images corresponding to the respective data files in the positions determined by the data file arrangement determining unit and arranging the relation indication images in the positions determined by the relation indication determining unit,
   wherein the first display columns and the second display columns are arranged alternately in the template, and wherein a respective relation indication image arranged in a second display column indicates the association between the data file images arranged in the first display columns on both sides of the second display column.

2. The apparatus according to claim 1, wherein the generator generates the two-dimensional display pattern in a predetermined format which is displayable on a browser in a client apparatus, and
   a format of the data file images is a JPEG file format.

3. A computer-implemented method for managing data files comprising:
   using a computer to store plural data files and association information associating between the plural data files;
   generating a two-dimensional display pattern based on a template and the association information, wherein the two-dimensional display pattern indicates a relation diagram of the plurality of data files, and wherein the template includes tags which define a table that includes first display columns for arranging data file images corresponding to the data files and second display columns for arranging relation indication images corresponding to associations between the data files, wherein the template defines positions in the table using matrix values;
   determining positions where the data file images corresponding to the respective data files are arranged in the first display columns of the table defined by the tags of the template based on the association information and matrix values of the template, with a data file arrangement determining unit;
   determining positions where the relation indication images corresponding to the associations between the data files are arranged in the second display columns of the table defined by the tags of the template based on the association information and matrix values of the template, with a relation indication determining unit; and
   generating the two-dimensional display pattern by arranging the data file images corresponding to the respective data files in the positions determined by the data file arrangement determining unit and arranging the relation indication images in the positions determined by the relation indication determining unit,
   wherein the first display columns and the second display columns are arranged alternately in the template, and wherein a respective relation indication image arranged in a second display column indicates the association between the data file images arranged in the first display columns on both sides of the second display column.

4. A computer readable recording medium having a program for executing in an apparatus for managing data files including a memory, a data file arrangement determining unit, a relation indication determining unit, and a generator, and for causing said apparatus to:
   store plural data files and association information associating between the plural data files;
   generate a two-dimensional display pattern based on a template and the association information, wherein the two-dimensional display pattern indicates a relation diagram of the plurality of data files, and wherein the template includes tags which define a table that includes first display columns for arranging data file images corresponding to the data files and second display columns for arranging relation indication images corresponding to associations between the data files, wherein the template defines positions in the table using matrix values;

determine positions where the data file images corresponding to the respective data files are arranged in the first display columns of the table defined by the tags of the template based on the association information and matrix values of the template, with the data file arrangement determining unit;

determine positions where the relation indication images corresponding to the association associations between the data files are arranged in the second display columns of the table defined by the tags of the template based on the association information and matrix values of the template, with the relation indication determining unit; and generate, with the generator, the two-dimensional display pattern by arranging the data file images corresponding to the respective data files in the positions determined by the data file arrangement determining unit and arranging the relation indication images in the positions determined by the relation indication determining unit, wherein the first display columns and the second display columns are arranged alternately in the template, and wherein a respective relation indication image arranged in a second display column indicates the association between the data file images arranged in the first display columns on both sides of the second display column.

5. An apparatus for managing data files comprising:

a data storing unit for storing plural data files, data file images representing the respective plural data files, plural relation indication images representing relations among the data files, and association information associating the respective plural data files;

a retrieving unit for determining a data file to be a center of an association which includes a data file designated by a user, based on the association information, when the user designates the data file from the plural data files, and for extracting a plurality of data files associated with the data file determined to be the center based on the association information;

a selector for selecting relation indication images to be used between the plurality of extracted data files on the basis of the association information of the plurality of extracted data files; and a generator for generating a relation diagram representing relations among the extracted data files using a template, wherein the template includes tags which define a table that includes first display columns for arranging the data file images and second display columns for arranging the relation indication images, wherein the first display columns and the second display columns are arranged alternately, wherein a respective relation indication image arranged in a second display column indicates a relationship between the data file images arranged in the first display columns on both sides of the second display column, wherein the relation indication images include additional position display images for representing positions where a new data file is addable to the relation diagram, and wherein the apparatus further comprises:

an additional information receiver for receiving additional file information for specifying a new data file to be added and additional position information for specifying a position of one of the additional position display images when the one of the additional position display images is designated by a user; and an association information updating unit for updating the association information of data files adjacent to the position specified by the additional position information on the basis of the additional file information and the additional position information.

6. The apparatus according to claim 5, wherein the data file images are thumbnail images of the data files comprising JPEG data, and wherein the relation diagram is HTML data.

7. The apparatus according to claim 5, wherein at least one of the relation indication images is constituted by an image set comprising plural images.

8. The apparatus according to claim 5, wherein the association information is information for specifying data files located one hierarchy above the respective plural data files associated with one another hierarchically and the data file to be a center is a data file that does not have information for specifying data files.

9. The apparatus according to claim 5, wherein the generator further includes a code generator for generating a relation indication code for representing the relation diagram of a tree structure using the association information of the extracted data file, wherein the data file images represent the respective extracted data files and the selected relation indication image.

10. The apparatus according to claim 5, wherein the association information is information for specifying a data file located one hierarchy above the respective plural data files associated with one another hierarchically, and the association information updating unit updates the association information by setting the association information of the data file to be added as information for specifying a data file located in a high-order hierarchy of data files adjacent to the position specified by the additional position information, and sets the association information of a data file located in a low-order hierarchy of the data files adjacent to the position specified by the additional position information as information specifying the data file to be added.

11. The apparatus according to claim 5, further comprising an update instruction receiver for receiving update instruction information for the association information; and an update controller for generating updated data file relation indication data by operating the association information updating unit to update the association information and operate the generator, wherein the updated data file relation indication data is generated when an update instruction is received.

12. The apparatus according to claim 5, wherein the association information is stored in a data storing unit in a form in which plural pieces of the association information are provided for one data file.

13. The apparatus according to claim 5, wherein when the retrieving unit determines that there are plural data files to be a center of the association including the designated data file, the generator generates a plurality of relation diagrams so as to generate plural tree structures.

14. The apparatus according to claim 5, further comprising an association information update unit for updating, when information instructing deletion of a data file among the plural data files is received, the association information by directly associating a data file one hierarchy above the deleted data file and a data file one hierarchy below the deleted data file.

15. The apparatus according to claim 5, further comprising an association information update unit for deleting, when information instructing release of association with a data file among the plural data files is received, the association information for associating the released data file and a data file one hierarchy above the released data file.

16. A computer-implemented method for managing data files comprising:
- using a computer to store data including plural data files, data file images representing the respective plural data files, plural relation indication images representing relations among the data files, and association information associating the respective plural data files;
- determining a data file to be a center of an association which includes a data file designated by a user, based on the association information, when the user designates the data file from the plural data files;
- extracting a plurality of data files associated with the data file determined to be the center, based on the association information;
- selecting relation indication images to be used between the plurality of extracted data files on the basis of the association information of the plurality of extracted data files; and
- generating a relation diagram representing relations among the extracted data files using a template, wherein the template includes tags which define a table that includes first display columns for arranging the data file images and second display columns for arranging the relation indication images, wherein the first display columns and the second display columns are arranged alternately, wherein a respective relation indication image arranged in a second display column indicates a relationship between the data file images arranged in the first display columns on both sides of the second display column,
- wherein the relation indication images include additional position display images for representing positions where a new data file is addable to the relation diagram, and
- wherein the method further comprises:
- receiving additional file information for specifying a new data file to be added and additional position information for specifying a position of one of the additional position display images when the one of the additional position display images is designated by a user; and
- updating the association information of a data file adjacent to the position specified by the additional position information on the basis of the additional file information and the additional position information.

17. The method according to claim 16, wherein
the association information is stored in a data storing unit in a form in which plural pieces of the association information are provided for one data file, and
when it is determined that there are plural data files to be a center of the association, display positions of the data file images and the relation indication images are determined so as to generate plural relation diagrams.

18. The method according to claim 16, wherein a relation indication code is generated for representing a relation diagram using the association information of the extracted data file group, and is used in the selecting of the relation indication image and in the generating of the relation diagram.

19. The method according to claim 16, further comprising:
- receiving update instruction information for the association information; and
- controlling update by updating the association information and thereby generating updated data file relation indication data, wherein the association information is updated when an update instruction is received.

20. The method according to claim 16, wherein
the association information is stored in a form in which plural pieces of the association information are provided for one data file, and
wherein when it is determined that there are plural data files to be a center of the association including the determined data file, display positions of the data file image and the relation indication image are determined so as to generate plural relation diagrams.

21. The method according to claim 16, further comprising updating, when information instructing deletion of a file among the plural data files is received, the association information with an association information updating unit by directly associating a data file one hierarchy above the deleted data file and a data file one hierarchy below the deleted data file.

22. The method according to claim 16, further comprising deleting, when information instructing release of association with a data file among the plural data files is received, the associating information for associating the released data file and a data file one hierarchy above the released file with an association information updating unit.

23. A computer readable recording medium having a program for causing a computer to:
- store data including plural data files, data file images representing the respective plural data files, plural relation indication images representing relations among the data files, and association information associating the respective plural data files;
- determine a data file to be a center of an association which includes a data file designated by a user, based on the association information, when the user designates the data file from the plural data files;
- extract a plurality of data files associated with the data file determined to be the center, based on the association information;
- select a relation indication image to be used between the plurality of extracted data files on the basis of the association information of the plurality of extracted data files; and
- generate a relation diagram representing relations among the extracted data files using a template, wherein the template includes tags which define a table that includes first display columns for arranging the data file images and second display columns for arranging the relation indication images, wherein the first display columns and the second display columns are arranged alternately, wherein a respective relation indication image arranged in a second display column indicates a relationship between the data file images arranged in the first display columns on both sides of the second display column,
- wherein the relation indication images include additional position display images for representing positions where a new data file is addable to the relation diagram, and
- wherein the program further causes the computer to:
- receive additional file information for specifying a new data file to be added and additional position information for specifying a position of one of the additional position display images when the one of the additional position display images is designated by a user; and
- update the association information of a data file adjacent to the position specified by the additional position information on the basis of the additional file information and the additional position information.

24. The computer readable recording medium according to claim 23, wherein
the association information is stored in a data storing unit in a form in which plural pieces of the association information are provided for one data file, and when it is determined that there are plural data files to be a center of the association including the determined data file, display positions of the data file images and the relation indication images are determined so as to generate plural relation diagrams.

25. The computer readable recording medium according to claim 23, wherein a relation indication code is generated for representing a relation diagram using the association information of the extracted data file group and is used in the selecting of the relation indication image and in the generating of the relation diagram.

26. The computer readable recording medium according to claim 23, wherein the program causes the computer to:
   receive update instruction information for the association information; and
   control update by updating the association information and generating thereby updated data file relation indication data, wherein the association information is updated when an update instruction is received.

27. The computer readable recording medium according to claim 23, wherein
   the association information is stored in a form in which plural pieces of the association information are provided for one data file, and
   wherein when it is determined that there are plural data files to be a center of the association including the predetermined data file, display positions of the data file image and the relation indication image are determined so as to generate plural relation diagrams.

28. The computer readable recording medium according to claim 23, wherein the program further causes the computer to:
   update, when information instructing deletion of a data file among the plural data files is received, the association information with an association information updating unit by directly associating a data file one hierarchy above the deleted data file and a data file one hierarchy below the deleted data file.

29. The computer readable recording medium according to claim 23, wherein the program further causes the computer to:
   delete, when information instructing release of association with a data file among the plural data files is received, the associating information for associating the released data file and a data file one hierarchy above the released file with an association information updating unit.

* * * * *